US011930442B2

(12) United States Patent
Vamanan et al.

(10) Patent No.: US 11,930,442 B2
(45) Date of Patent: Mar. 12, 2024

(54) REDUCING WIRELESS DEVICE SERVICE INTERRUPTIONS

(71) Applicant: Apple Inc., Cupertino, CA (US)

(72) Inventors: Sudeep Manithara Vamanan, Uttenreuth (DE); Roland Gruber, Sauerlach (DE); Nirlesh Koshta, Karntaka (IN); Anikethan Ramakrishna Vijaya Kumar, Karntaka (IN); Sridhar Prakasam, Fremont, CA (US); Mona Agnel, Uxbridge (GB); Krisztian Kiss, Hayward, CA (US); Vijay Venkataraman, San Jose, CA (US); Haijing Hu, Beijing (CN); Robert Zaus, Munich (DE)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 17/566,406

(22) Filed: Dec. 30, 2021

(65) Prior Publication Data
US 2022/0225214 A1    Jul. 14, 2022

(30) Foreign Application Priority Data
Jan. 13, 2021  (IN) .............................. 202141001694

(51) Int. Cl.
*H04W 48/10*  (2009.01)
*H04W 4/90*  (2018.01)
*H04W 48/18*  (2009.01)

(52) U.S. Cl.
CPC ............ *H04W 48/10* (2013.01); *H04W 4/90* (2018.02); *H04W 48/18* (2013.01)

(58) Field of Classification Search
CPC .................................................... H04W 48/10

USPC ...................................................... 455/432.1
See application file for complete search history.

(56) References Cited

U.S. PATENT DOCUMENTS

| 2007/0037577 | A1* | 2/2007 | Dalsgaard | ............. | H04W 48/18 455/433 |
| 2016/0066235 | A1* | 3/2016 | Bhat | ..................... | H04W 36/14 455/436 |

FOREIGN PATENT DOCUMENTS

| WO | 2020000237 | 2/2020 |
| WO | 2020101747 | 5/2020 |
| WO | WO-2022097096 A1 * | 5/2022 |

OTHER PUBLICATIONS

Examination Report for IN Patent Application No. 202141001694; 7 pages; dated Feb. 16, 2022.

* cited by examiner

*Primary Examiner* — Qutbuddin Ghulamali
(74) *Attorney, Agent, or Firm* — Kowert, Hood, Munyon, Rankin & Goetzel, P.C.

(57) ABSTRACT

Apparatuses, systems, and methods for reducing wireless device service interruptions. An indication of a disaster condition may be provided to a wireless device. The disaster condition may affect a home public land mobile network of the wireless device. The wireless device may perform cell selection in a manner influenced by the indication of the disaster condition. This may include considering cells associated with a forbidden public land mobile network for the cell selection, or excluding cells associated with the home public land mobile network of the wireless device that are unavailable, for example due to the disaster condition, among various possibilities.

20 Claims, 16 Drawing Sheets

Mapping Table for Access Categories

| Rule # | Type of access attempt | Requirements to be met | Access Category |
|---|---|---|---|
| . . | | | |
| 8.x | UE initial registration attempt in a roaming PLMN under Disaster Roaming | Access attempt is for MO signalling | 11 |

FIG. 15

Access Identities

| Access Identity number | UE Configuration |
|---|---|
| 3 | UE is roaming in a PLMN due to Disaster Condition |

FIG. 16

REDUCING WIRELESS DEVICE SERVICE INTERRUPTIONS

PRIORITY DATA

This application claims benefit of priority to Indian Application No. 202141001694, titled "Reducing Wireless Device Service Interruptions", filed Jan. 13, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for reducing wireless device service interruptions in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for reducing wireless device service interruptions in a wireless communication system.

The techniques may include various mechanisms for indicating when a disaster condition is affecting the home network of a wireless device, potentially both for indicating cells of the home network that are not currently available due to the disaster condition, and for indicating cells that are temporarily accepting inbound disaster roaming wireless devices. The disaster condition may include an outage for at least a portion of the core network and/or radio access network of the home network of the wireless device.

A wireless device receiving such information relating to a disaster condition may make use of the information to inform searches for networks and/or cells (e.g., to potentially include one or more networks and/or cells that would normally be forbidden to access, but that have indicating that disaster roaming is being temporarily supported), which may in turn allow the wireless device to register with and obtain disaster roaming service while the home network of the wireless device is unable to provide normal service to the wireless device.

Techniques are also described herein for facilitating return of such wireless devices to their home network when such a disaster condition ends or when leaving the area affected by the disaster condition.

The techniques described herein may be implemented in and/or used with a number of different types of devices, including but not limited to cellular phones, tablet computers, wearable computing devices, portable media players, unmanned aerial vehicles, unmanned aerial controllers, automobiles and/or motorized vehicles, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 15-16 are tables illustrating example access parameters that could be used by a wireless device when performing temporary registration on a host network when disaster roaming conditions are present, according to some embodiments;

Figure 1:
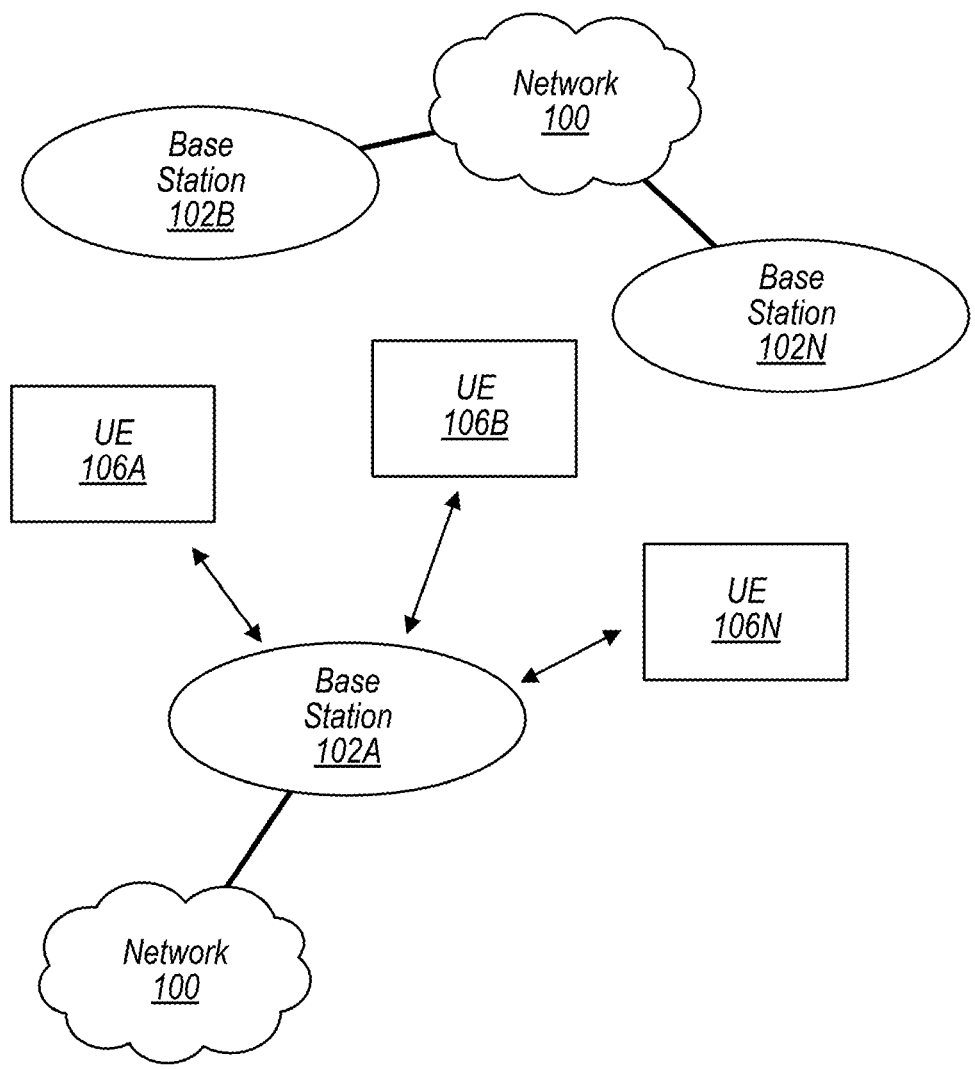
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
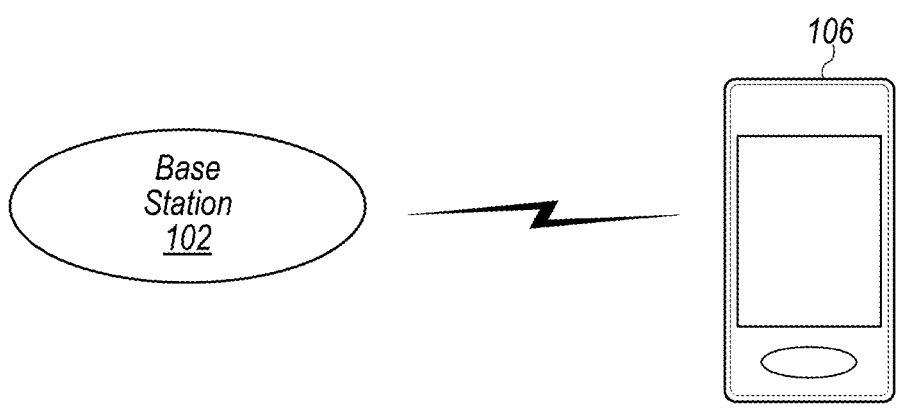
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, an unmanned aerial vehicle (UAV), an unmanned aerial controller (UAC), an automobile, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/ eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
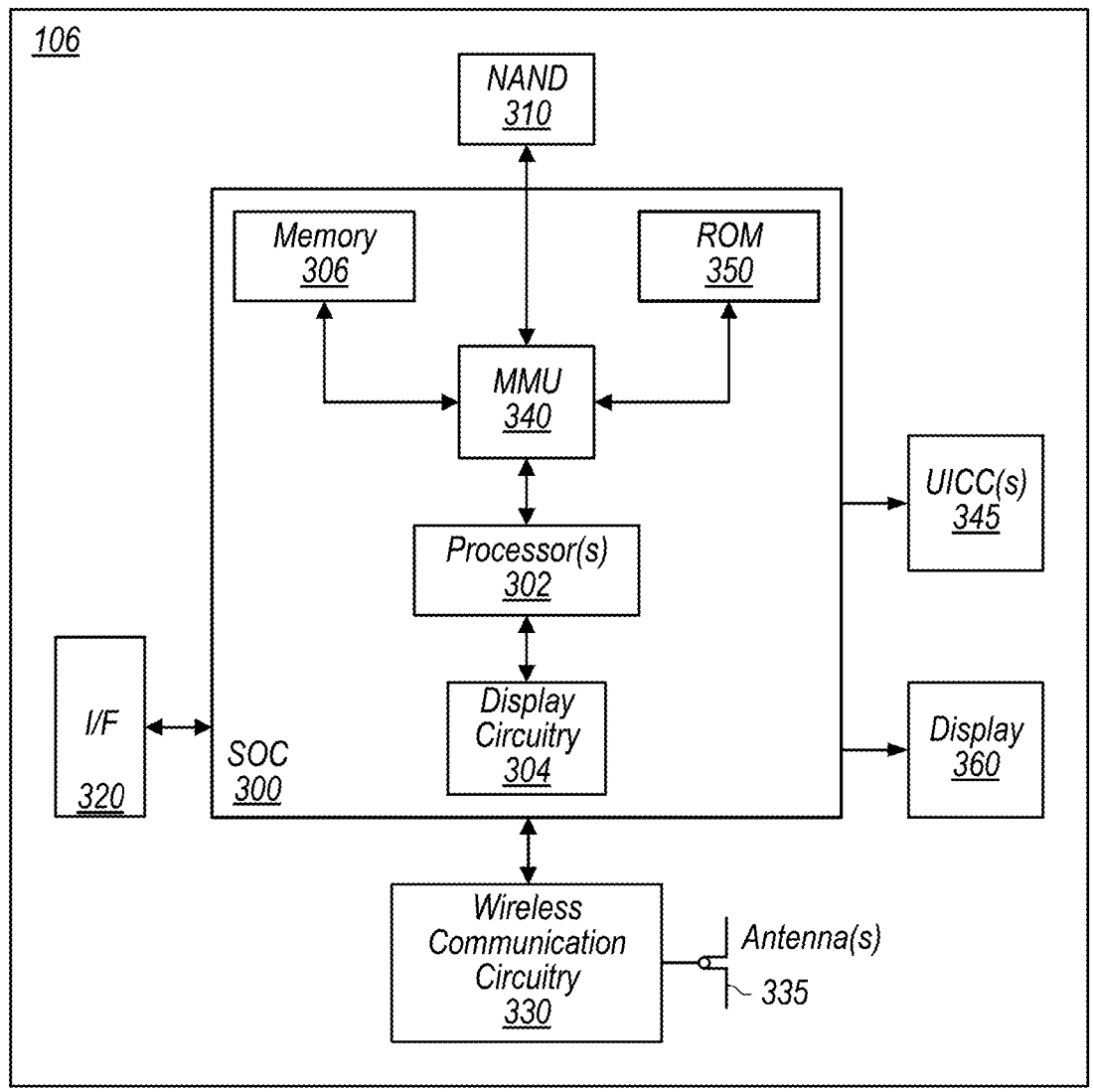
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE)

device, a mobile device or mobile station, a wireless device or wireless station, a desktop computer or computing device, a mobile computing device (e.g., a laptop, notebook, or portable computing device), a tablet, an unmanned aerial vehicle (UAV), an unmanned aerial controller (UAC), an automobile, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
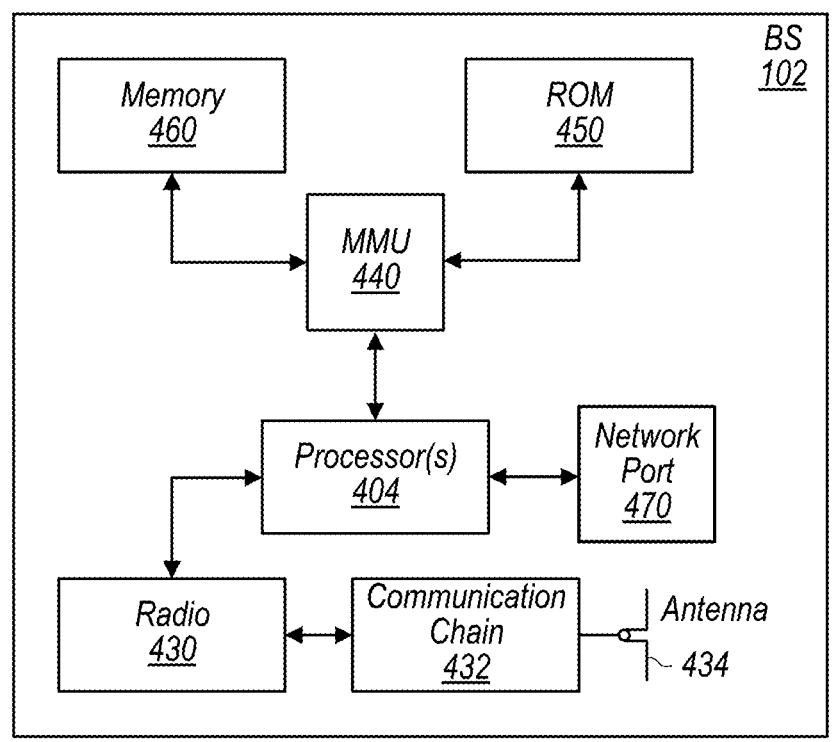
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
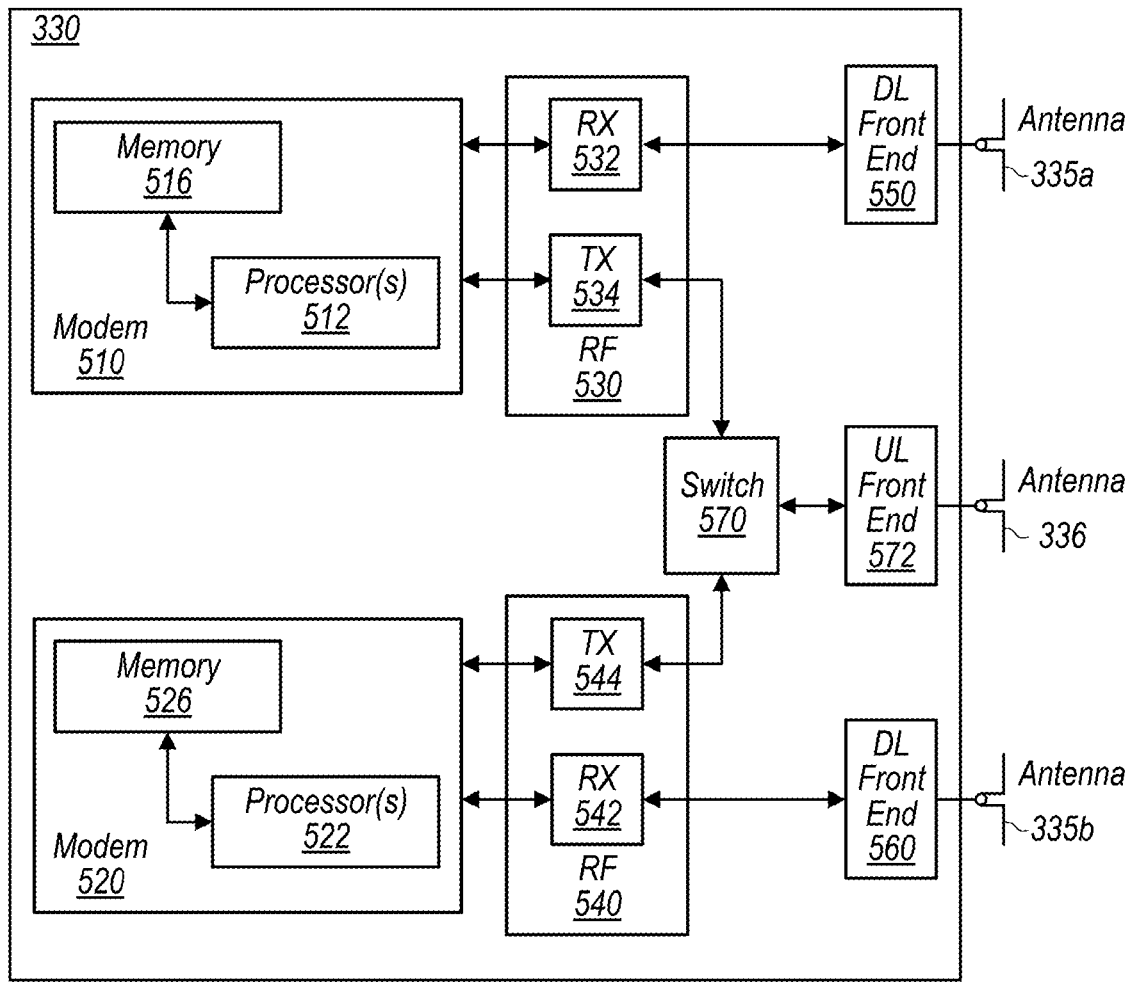
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), an unmanned aerial controller (UAC), an automobile, and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
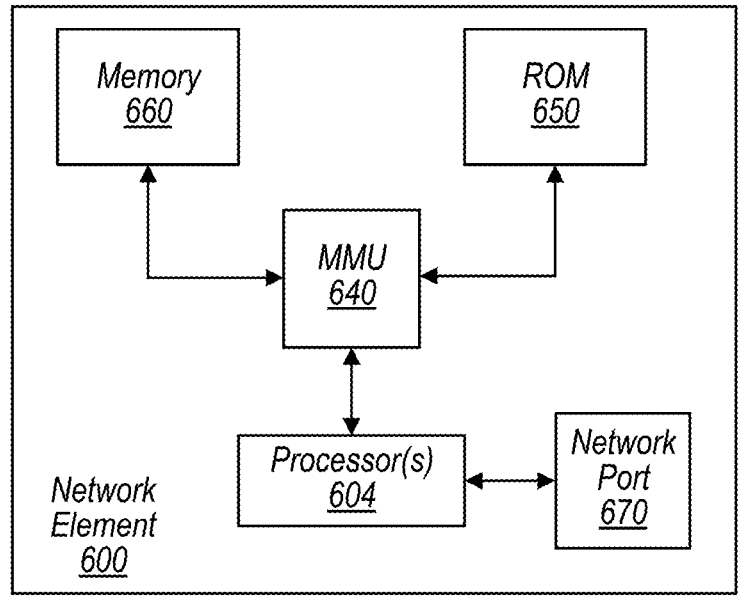
FIG. 6 illustrates an example block diagram of a network element, according to some embodiments.

FIG. 6—Exemplary Block Diagram of a Network Element

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
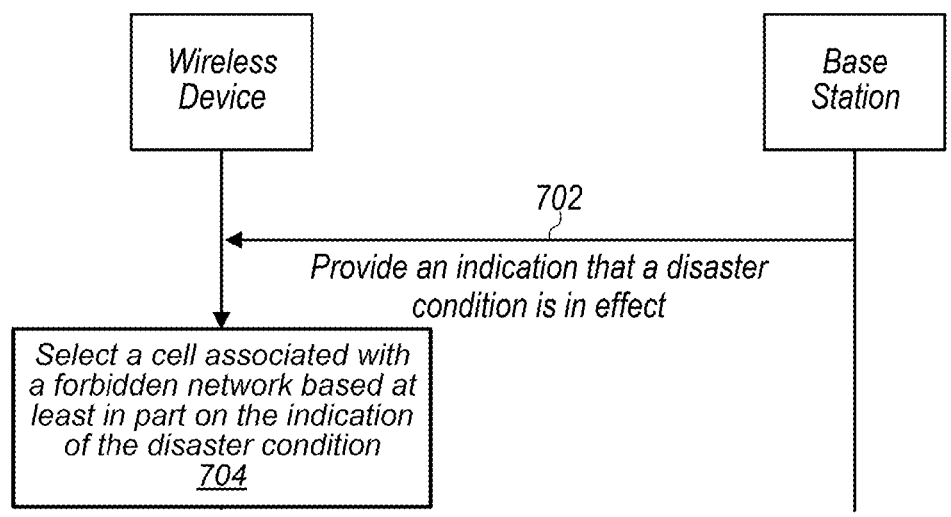
FIG. 7 is a flowchart diagram illustrating an example method for reducing wireless device service interruptions in a wireless communication system, according to some embodiments.

FIG. 7—Reducing Wireless Device Service Interruptions

New cellular communication techniques are continually under development, to increase coverage, to better serve the range of demands and use cases, and for a variety of other reasons. As new cellular communication technologies are developed and deployed, certain features may be included that are new or differ from previously developed and deployed cellular communication technologies.

As the number of generations of cellular communication technologies that can be deployed simultaneously (e.g., in parallel) increases, so may the potential number of options for a wireless device to obtain services. Such parallel deployment of multiple generations of cellular communication technologies, as well as the possible parallel deployment of network infrastructure equipment by multiple cellular service providers in many regions, may have the potential to increase the robustness of service availability when conditions are present that cause some equipment and/or services of some cellular service providers to become temporarily unavailable, such as could occur in certain disaster conditions. However, unless sufficient procedures and agreements are in place for supporting provision of service to wireless devices that are unable to obtain cellular service through their normal cellular service provider because of such disaster conditions, it may also be possible that a wireless device in the vicinity of the disaster conditions could be unable to obtain service even if another cellular service provider is still providing service in that area.

Thus, in order to reduce the interruptions to service that could be caused in such a scenario, it may be useful to provide a framework for cellular service providers to identify and indicate when disaster conditions are present. Such indications may assist wireless devices to determine when certain normally available services are unavailable from a given network, and/or that roaming on a network is temporarily allowed even if normal service agreements would not support such roaming. This may, for example, improve the likelihood that a wireless device is able to maintain (or recover) service when unexpected interruptions to the availability of network equipment and/or services occur.

Accordingly, FIG. 7 is a signal flow diagram illustrating an example of a method for reducing wireless device service interruptions in a wireless communication system, at least according to some embodiments. Aspects of the method of FIG. 7 may be implemented by a wireless device such as a UE 106 illustrated in various of the Figures herein, a base station such as a B S 102 illustrated in various of the Figures herein, a network element such as an AMF, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

A cellular base station may provide an indication to a wireless device that a disaster condition is in effect (702). The disaster condition may affect a home public land mobile network of the wireless device. The indication of the disaster condition may be provided in any of various ways, from any of various sources. In some instances, multiple types of indication of a disaster condition may be provided.

As one possibility, the indication of the disaster condition may include an indication to activate disaster roaming that is provided in a radio resource control (RRC) release message. For example, if the disaster condition affects a core network entity or entities of the home PLMN of the wireless device such that a cell with which the wireless device has established a RRC connection is partially or entirely unable to access or obtain normal service from the core network of the PLMN, the cell may release the RRC connection with cause information indicating to activate disaster roaming. Note that it may be possible for the cellular base station providing the cell to be informed of the core network outage (e.g., via an indication from an operation and management function of the PLMN), and/or for the cellular base station to autonomously determine that the core network outage is occurring, in various scenarios.

As another possibility, the indication of the disaster condition may include information provided in system information broadcast by a cell and received by the wireless device. The cell may, for example, be a cell that is affected by the disaster condition, in which case the indication may include an indication that the cell is not available for service, and/or may otherwise indicate that a disaster condition is affecting the cell. As another possibility, the cell may be a cell that is not affected by the disaster condition but that has been informed of the disaster condition. For example, the cell may be a cell in the home PLMN of the wireless device whose neighbor cells and/or tracking area may be affected by the disaster condition. In such a scenario, the cell may provide an indication of the one or more cells and/tracking areas that are not available for service (e.g., due to the disaster condition), which may assist the wireless device to avoid evaluating such cells for cell selection, and/or from selecting such cells on which to camp. Alternatively, such a cell may modify the neighbor cell information included in the system information broadcast by the cell to not include any cells that are currently experiencing outages, at least according to some embodiments.

As another example, the cell may be a cell in a non-home PLMN for the wireless device, which may still be capable of providing service in a region in which the home PLMN of the wireless device is unavailable. In such a scenario, the cell may provide an indication that disaster roaming is allowed on the cell. The indication that disaster roaming is allowed on the cell may include a 1 bit indicator simply indicating a true or false indication for whether disaster roaming is allowed on the cell, in some instances. Additionally, or alternatively, the indication that disaster roaming is allowed on the cell may include any amount and/or type of additional information, such as a list of PLMNs for which disaster roaming is allowed (which may, for example, include the home PLMN of the wireless device, if applicable). Thus, in some instances, the indication that disaster roaming is allowed may include information indicating that disaster roaming is allowed on the cell for subscribers of the home PLMN of the wireless device. Such information may be helpful to assist the wireless device to determine whether to consider the cell for possible cell selection, potentially even if the cell belongs to a PLMN that is a forbidden PLMN for the wireless device.

Note that a forbidden PLMN may include a PLMN that the wireless device is not normally allowed to access, such as may be the case if the forbidden PLMN and the home PLMN of the wireless device do not have a service agreement allowing the wireless device to roam on the forbidden PLMN. If the wireless device has previously unsuccessfully attempted to register for service on a cell of a forbidden PLMN, the wireless device may store information in a forbidden PLMN list indicating that that particular PLMN is forbidden. It may also be possible for a PLMN to be forbidden but for the wireless device to not have information stored in its forbidden PLMN list indicating as much, e.g., if the wireless device has not attempted to register for service on a cell of the PLMN.

As a still further possibility, it may be possible that the wireless device has non-3GPP access to the home PLMN of the wireless device while a disaster condition affects the 3GPP radio access network (RAN) of the home PLMN of the wireless device. In such a scenario, the home PLMN of the wireless device may provide a de-registration request to the wireless device by way of indicating the disaster condition. The de-registration request may indicate that re-registration is required, and that only non-3GPP access to the home PLMN of the wireless device is available, e.g., to inform the wireless device that the 3GPP RAN is currently unavailable for the home PLMN of the wireless device (e.g., at least in its current region).

The wireless device may perform cell selection (704). The wireless device may search for a cell of a PLMN from which the wireless device may be able to obtain service based at least in part on the indication of the disaster condition. For example, if the wireless device was released from RRC connected mode, deregistered, and/or informed that a cell on which it was camping was unavailable for service (e.g., due to the disaster condition), this may trigger the wireless device to attempt to find another cell. The cell selection may include evaluation of one or more potentially available cells, which may include cells known from neighbor cell list(s) broadcast in system information from a previous serving cell (or another cell from which the wireless device acquired system information), and/or cells found via a broader PLMN search and/or band scan, among various possibilities. The cell evaluation(s) may include performing one or more cell measurements (e.g., signal strength, signal quality, etc.) and selecting a cell that meets specified threshold requirements for the cell measurements. The cell may be selected entirely based on the cell measurements, or the cell selection may take into account one or more other additional or alternative considerations; for example, in some instances, the cell selection may be prioritized to bias the selection in favor of certain cells (e.g., cells of a preferred PLMN, as one possibility) and/or to bias the selection against certain cells (e.g., cells of a forbidden PLMN, as one possibility).

The cells considered/evaluated for the cell selection may be affected by the indication of the disaster condition. For example, the cell selection may be performed in a manner that includes consideration of cells that are designated forbidden, such as cells belonging to a network on a list of networks that the wireless device is forbidden to access, e.g., based at least in part on the indication of the disaster condition, where otherwise it might be the case that such cells are excluded from consideration. In other words, the cell selection may temporarily ignore the forbidden PLMN list of the wireless device, at least in some embodiments. As another (e.g., additional or alternative) possibility, the cell selection may exclude from consideration one or more neighbor cells and/or cells in one or more tracking areas that are indicated as being unavailable (e.g., due to the disaster condition).

At least in some embodiments, based on the cell selection, the wireless device may select a cell associated with a forbidden network, and may camp on the selected cell (e.g., including acquiring system information for the cell, performing timing and/or frequency acquisition, etc.). In some embodiments, the wireless device may select a PLMN lower in priority in its preferred PLMN lists if a higher priority PLMN is in a disaster condition. The wireless device may attempt to perform registration with the cell associated with the forbidden (or lower priority) network. For example, in some instances, the cell may be a cell that has indicated that disaster roaming is allowed (e.g., potentially including specifically indicating that disaster roaming is allowed for subscribers of the home PLMN of the wireless device). This may include establishing a RRC connection with a cellular base station that provides the cell, and providing a registration request to a core network entity (e.g., an AMF in a 5G NR CN, a MME in a 4G LTE CN, etc.) via the cell.

The CN of the PLMN may attempt to contact one or more CN entities of the home PLMN of the wireless device, e.g., to potentially authenticate and determine which services to provide to the wireless device. For example, the CN of the PLMN may attempt to contact the Authentication Server Function (AuSF) and/or the unified data management (UDM) function of the PLMN of the wireless device. If the CN of the PLMN is able to contact the applicable CN entities of the home PLMN of the wireless device and authenticate the wireless device, the CN of the PLMN may accept the registration request and provide normal service to the wireless device. If the wireless device has selected a disaster roaming PLMN that indicated a disaster condition for a Home PLMN or equivalent Home PLMNs of the wireless device, and if the PLMN has accepted the registration request for normal service, the wireless device may suspend the periodic search for its Home PLMN or equivalent home PLMNs.

As another possibility, the wireless device may be configured with an alternate international mobile subscriber identity (IMSI) configured for use for disaster roaming. Such an alternate IMSI may be used to facilitate authentication and receipt of services even when the CN of the home PLMN of the wireless device is unavailable. For example, if the CN of the PLMN is unable to authenticate and/or confirm which services to provide the wireless device via the CN of the home PLMN of the wireless device, it may be possible for the CN of the PLMN to trigger the wireless device to activate the set of security keys configured for use for disaster roaming, possibly by triggering an IMSI refresh by the wireless device. In such a scenario, the wireless device may indicate to a USIM module of the wireless device about the disaster condition, the USIM may decide to perform an IMSI refresh, the USIM may activate the IMSI configured for use for disaster roaming, and the wireless device may attempt to register with the PLMN using the IMSI configured for use for disaster roaming. If this authentication is successful, the CN of the PLMN may accept the registration request and provide normal service to the wireless device.

Note that if the CN of the PLMN is unable to authenticate and/or confirm which services to provide the wireless device, the PLMN may reject the registration request. However, at least in some instances, the wireless device may still be able to perform registration for emergency services with the PLMN, e.g., even if it is a forbidden PLMN for the wireless device.

Note also that, at least in some instances, a PLMN that offers inbound disaster roaming may utilize one or more access control techniques, e.g., to avoid or reduce the potential negative congestion impact that could occur on subscribers of the PLMN with an influx of inbound disaster roaming devices. As one such possibility, an access category associated with disaster roaming may be configured, and may be used by inbound disaster roaming wireless devices attempting to register with the PLMN. As another such possibility, an access identity number associated with disaster roaming may be configured, and may be used by inbound disaster roaming wireless devices attempting to register with the PLMN. As a still further possibility, unified access control barring information for inbound disaster roaming (e.g., including an offset to be applied to the barring factor) may be included with system information broadcast by cells of the PLMN offering inbound disaster roaming. Any or all such mechanisms may provide the PLMN with the ability to implement separate access (and potentially access barring) for inbound disaster roaming devices from access for subscriber devices, which may in turn allow access by inbound disaster roaming devices to be managed in a manner that limits potential negative impact on service received by subscriber devices of the PLMN.

It may be useful to further provide techniques for handling returning a wireless device to its home PLMN when the disaster condition is no longer in effect and/or when the wireless device moves outside of the region in which the disaster condition affects the home PLMN of the wireless device.

Accordingly, as one possibility, it may be the case that the (e.g., forbidden) PLMN with which the wireless device has registered and from which the wireless device is receiving cellular service receives an indication that the disaster condition is no longer affecting the home PLMN of the wireless device. In such a scenario, the PLMN may provide a de-registration request to the wireless device based at least in part on the indication that the disaster condition is no longer affecting the home PLMN of the wireless device. The de-registration request may include an indication that the wireless device is not allowed to access the PLMN. As another possibility, the PLMN may start a timer, which may be a certain amount (T1) longer than the periodic registration update time configured to the disaster roaming wireless devices, e.g., based on the indication that the disaster condition is no longer affecting the home PLMN of the wireless device. The PLMN may reject registration update requests by disaster roaming wireless devices during the time in which the timer T1 is running. As yet another possibility, the PLMN may indicate that the disaster condition is no longer applicable to the disaster roaming wireless devices (e.g., is no longer affecting the home PLMN of the wireless devices) by sending a non-access stratum (NAS) message. Such a message may include a timer value that the receiving wireless device may wait before triggering the PLMN search. The wireless device may receive the de-registration request or the non-access stratum message indicating the end of disaster condition, and may (possibly after a certain delay, e.g., while waiting for a configured timer to expire) trigger a new cell search (e.g., including a new PLMN search) to attempt to obtain service from the home PLMN of the wireless device or another PLMN that the wireless device is allowed to access. Note that the temporary ignoring of the forbidden PLMN list by the wireless device while the disaster condition was affecting the home PLMN of the wireless device may not be applied for the PLMN search.

As another possibility, the wireless device may perform handover to a RAN node that is not offering disaster roaming service to the wireless device (e.g., due to the disaster condition not affecting the home PLMN of the wireless device in the region of the RAN node. In such a scenario, the RAN node may provide a location update for the wireless device to the CN of the PLMN, and may receive an indication that the wireless device is outside of the area of the disaster condition in response. The PLMN may provide a de-registration request to the wireless device based at least in part on determining that the wireless device is outside of the area of the disaster condition. The de-registration request may include an indication that the wireless device is not allowed to access the PLMN. The wireless device may receive the de-registration request and perform de-registration, and may trigger a new cell search (e.g., including a new PLMN search) to attempt to obtain service from the home PLMN of the wireless device or another PLMN that the wireless device is allowed to access. Note that the temporary ignoring of the forbidden PLMN list by the wireless device while the disaster condition was affecting the home PLMN of the wireless device may not be applied for the PLMN search.

Additionally, techniques may be implemented to handle returning wireless devices that are in idle mode when the disaster condition is lifted or that undergo mobility out of the area of the disaster condition to their home PLMN, at least according to some embodiments.

As one aspect of such techniques, a UE initiating a periodic registration update, performing a mobility registration update procedure, performing a service request procedure, or performing an initial registration request from idle mode via a cell associated with a forbidden PLMN after the home PLMN of the wireless device has returned to service may receive a registration reject message in response. The registration reject message may indicate that the wireless device is not allowed to access the PLMN, or that roaming by the wireless device is not allowed in that particular tracking area of the PLMN, among various possibilities. This may trigger the wireless device to perform a PLMN search to attempt to obtain service from the home PLMN of the wireless device or another PLMN that the wireless device is allowed to access.

As another aspect of such techniques, cells that are no longer offering inbound disaster roaming may stop broadcasting an indication that disaster roaming is allowed, and similarly, cells that are outside of the area of the disaster condition may not broadcast an indication that disaster roaming is allowed. Wireless devices camping on such cells may evaluate this change and determine that removal (or lack) of disaster roaming information makes the cells unsuitable for camping, and may initiate a PLMN search to attempt to obtain service from the home PLMN of the wireless device or another PLMN that the wireless device is allowed to access. In some instances, cells may stop broadcasting the disaster roaming information after a certain amount of time has passed since the disaster roaming condition ceased to be applicable. The amount of time could be selected such as to be longer than a periodic registration update timer, in some instances, e.g., to increase the likelihood that a significant proportion of wireless devices would have already returned to their home PLMN before broadcasting of the disaster roaming information is stopped. Additionally or alternatively, the amount of time could be selected such as to be longer than the typical maximum service duration for an IMS emergency session or IMS voice over NR (VoNR) call, e.g., to reduce the likelihood that such a session (call) is dropped because the wireless device considers a possible handover candidate cell as not suitable.

Using such techniques to return wireless devices to their home PLMN after a disaster condition is no longer affecting their home PLMN may help stagger such returns in time, which may reduce the likelihood of congestion and heavy signaling load on the home PLMN that could be caused by a large volume of users returning to the home PLMN within a short time window.

Thus, the method of FIG. 7 may be used to reduce the number and/or length of interruptions to cellular service by wireless devices. As described herein, such techniques may be particularly helpful when disasters and/or other causes result in a portion of a cellular network being unavailable and/or unable to provide service, among various possible scenarios.

FIGS. 8-19 and Additional Information

FIGS. 8-19 illustrate further aspects that might be used in conjunction with the method of FIG. 7 if desired. It should be noted, however, that the exemplary details illustrated in and described with respect to FIGS. 8-19 are not intended to be limiting to the disclosure as a whole: numerous variations and alternatives to the details provided herein below are possible and should be considered within the scope of the disclosure.

In cellular communication systems, it may be desirable to increase the robustness of support for provision of service to cellular service subscribers when a network (e.g., a public land mobile network (PLMN)) is facing an outage due to a disaster condition (e.g., fire, flood, earthquake, etc., causing a temporary or long term service interruption, among various possible disaster conditions). As one possibility for accomplishing this, a feature in which a PLMN that is considered to be a forbidden PLMN under normal conditions may offer temporary roaming for UEs whose home PLMN (HPLMN) is experiencing an outage could be introduced. Note that, at least according to some embodiments, a PLMN that a UE has never tried to register on could be a forbidden PLMN even if not stored in a forbidden PLMN list. However, currently, a UE in automatic network selection mode may not access a PLMN stored on the UE's forbidden PLMN list, even if that PLMN can offer inbound roaming for UEs during a disaster condition.

Accordingly, various possible changes to UE and/or network configuration and/or behavior to support such a disaster roaming feature are described herein. These techniques may provide the possibility that the UE could access a PLMN stored on the UE's forbidden PLMN list (or that is otherwise normally forbidden) during specified disaster conditions, which may reduce the number of service interruptions and/or the length of service interruptions experienced by a wireless device under exceptional service outage circumstances.

Figure 8:
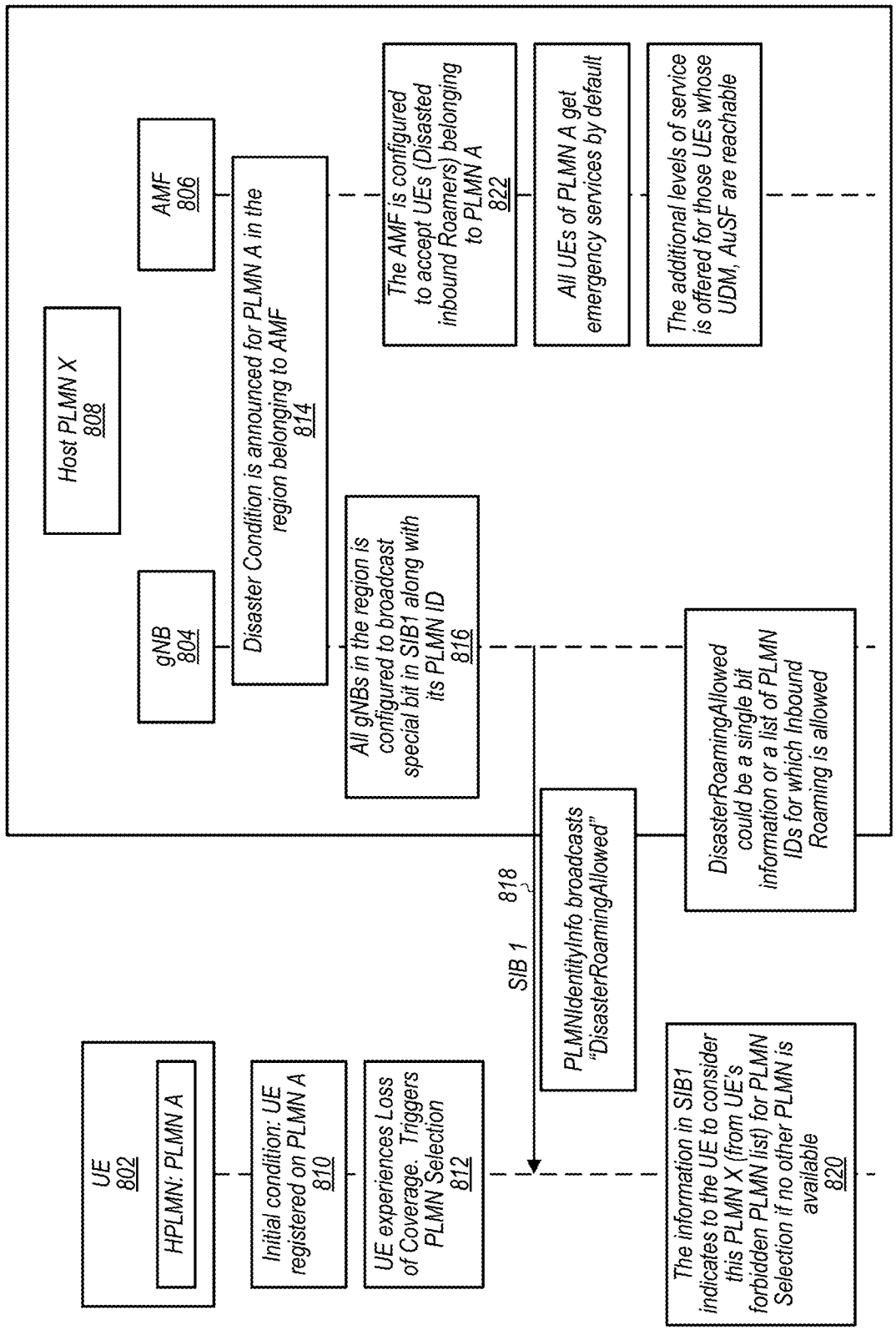
FIG. 8 is a signal flow diagram illustrating example techniques for indicating to a wireless device that disaster roaming conditions are present, according to some embodiments.

FIG. 8 is a signal flow diagram illustrating example techniques for indicating to a wireless device that disaster roaming conditions are present, according to some embodiments. In the illustrated scenario, a UE 802 may initially be registered on its HPLMN (PLMN A) (810). The UE 802 may experience loss of coverage, and may trigger PLMN selection (812).

PLMN X 808, including gNB 804 and AMF 806, may be informed of a disaster condition for PLMN A in the region of AMF 806 (814). The gNB 804 (along with other gNBs in the region) may be configured to broadcast information (e.g., a single bit, and/or additional information) indicating that disaster roaming is allowed on PLMN X (816). The gNB 804 may broadcast (e.g., in system information block 1 (SIB1)) the information indicating that disaster roaming is allowed on PLMN X (818). Note that the disaster roaming allowed indication could include a single bit of information (e.g., yes/no indication), and/or could include a list of PLMN IDs for which inbound disaster roaming is allowed, among various possibilities. The UE 802 may receive the information in the SIB1, and the UE 802 may consider PLMN X (which may be in the forbidden PLMN list for the UE 802) for PLMN selection (e.g., if no other PLMN is available) (820).

The AMF 806 may be configured to accept UEs (inbound disaster roaming UEs) belonging to PLMN A (822). All UEs of PLMN A may be supplied with emergency services by default. Additional levels of service may be offered for at least some UEs, e.g., possibly depending on whether the HPLMN user data management (UDM) function and/or Authentication Server Function (AuSF) for a UE is reachable.

Figure 9:
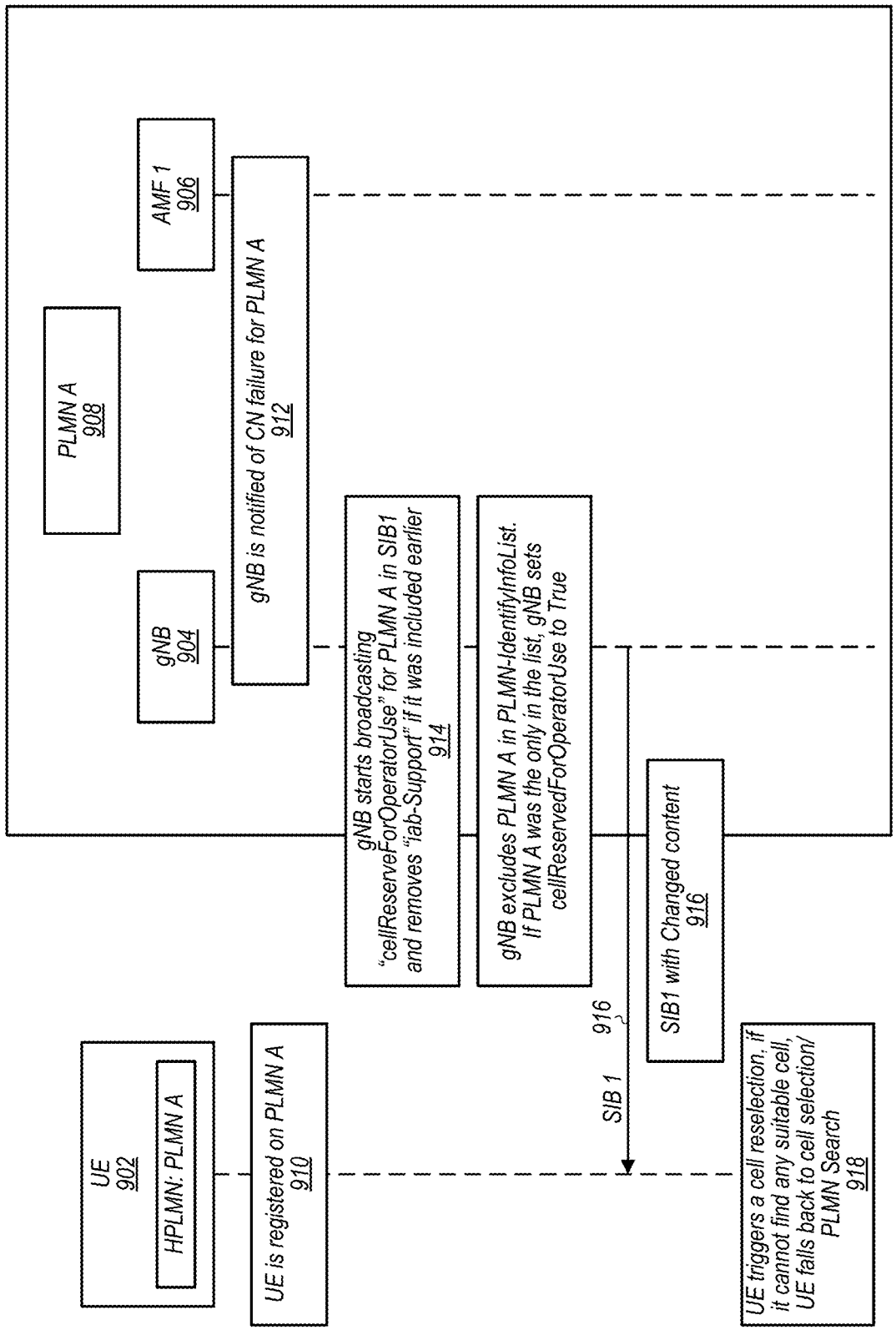
FIG. 9 is a signal flow diagram illustrating example techniques for reducing wireless device service interruptions in a scenario in which the home core network of a wireless device becomes unavailable while the wireless device is idle, according to some embodiments.

FIG. 9 is a signal flow diagram illustrating example techniques for reducing wireless device service interruptions in a scenario in which the home core network of a wireless device becomes unavailable while the wireless device is idle, according to some embodiments. In the illustrated scenario, a UE 902 may initially be registered on its HPLMN (PLMN A 908) (910). If the UE's HPLMN CN has failed, the UE may remain on the RAN (which may still have normal service), if that was its state prior to the disaster condition and the CN failure, such that the RAN may need to inform the UE of the failure of the CN once it is notified of the CN failure. Thus, the gNB 904 serving the UE 902, as well as the AMF 906 for the region, may be notified of CN failure for PLMN A 908 (912). The gNB 904 may begin broadcasting a "cellReserveForOperatorUse" indication for PLMN A in SIB1, and may remove the parameter "iab-Support" if it was previously being provided (914). The gNB 904 may further exclude PLMN A 908 in its PLMN-IdentityInfoList. If PLMN A 908 was the only PLMN in the list, gNB may set cellReservedForOperatorUse to True.

The gNB 904 may transmit SIB with the content changed to reflect the CN failure/the unsuitability of use of the gNB 904 to access PLMN A 908 (916). The UE 902 may receive the updated SIB1, which may trigger a cell re-selection (918). If the UE 902 can find another cell of the HPLMN that does not have this bit set, it may be able to camp on that cell and attempt mobility registration. If the UE 902 is unable to find any suitable cell in the HPLMN (or an equivalent home PLMN), the UE 902 may fall back to a PLMN search. If a cell of a PLMN belonging to the forbidden PLMN list of the UE 902 is found, the UE 902 may select that PLMN.

Figure 10:
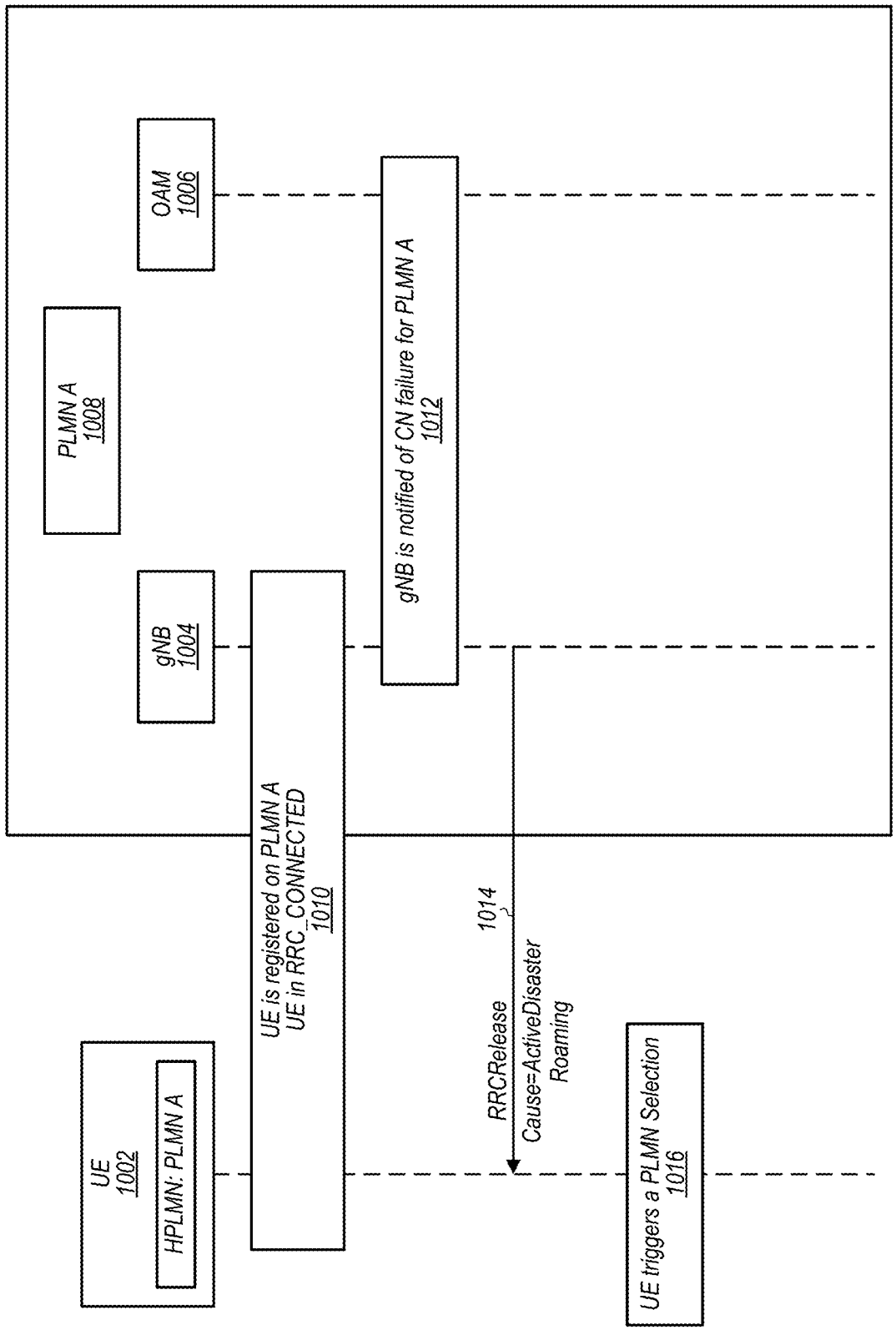
FIG. 10 is a signal flow diagram illustrating example techniques for reducing wireless device service interruptions in a scenario in which the home core network of a wireless device becomes unavailable while the wireless device is connected, according to some embodiments.

FIG. 10 is a signal flow diagram illustrating example techniques for reducing wireless device service interruptions in a scenario in which the home core network of a wireless device becomes unavailable while the wireless device is connected, according to some embodiments. In the illustrated scenario, a UE 1002 may initially be registered on its HPLMN (PLMN A 1008) (1010). The gNB 1004 serving the UE 1002, as well as the operation and management (OAM) function 1006, may be notified of CN failure for PLMN A 1008 (1012). The gNB 904 may provide a RRCRelease message to the UE 1002, with cause information indicating to "ActivateDisasterRoaming" (1014). The UE 1002 may trigger a PLMN selection based at least in part on the indication to activate disaster roaming (1016).

Figure 11:
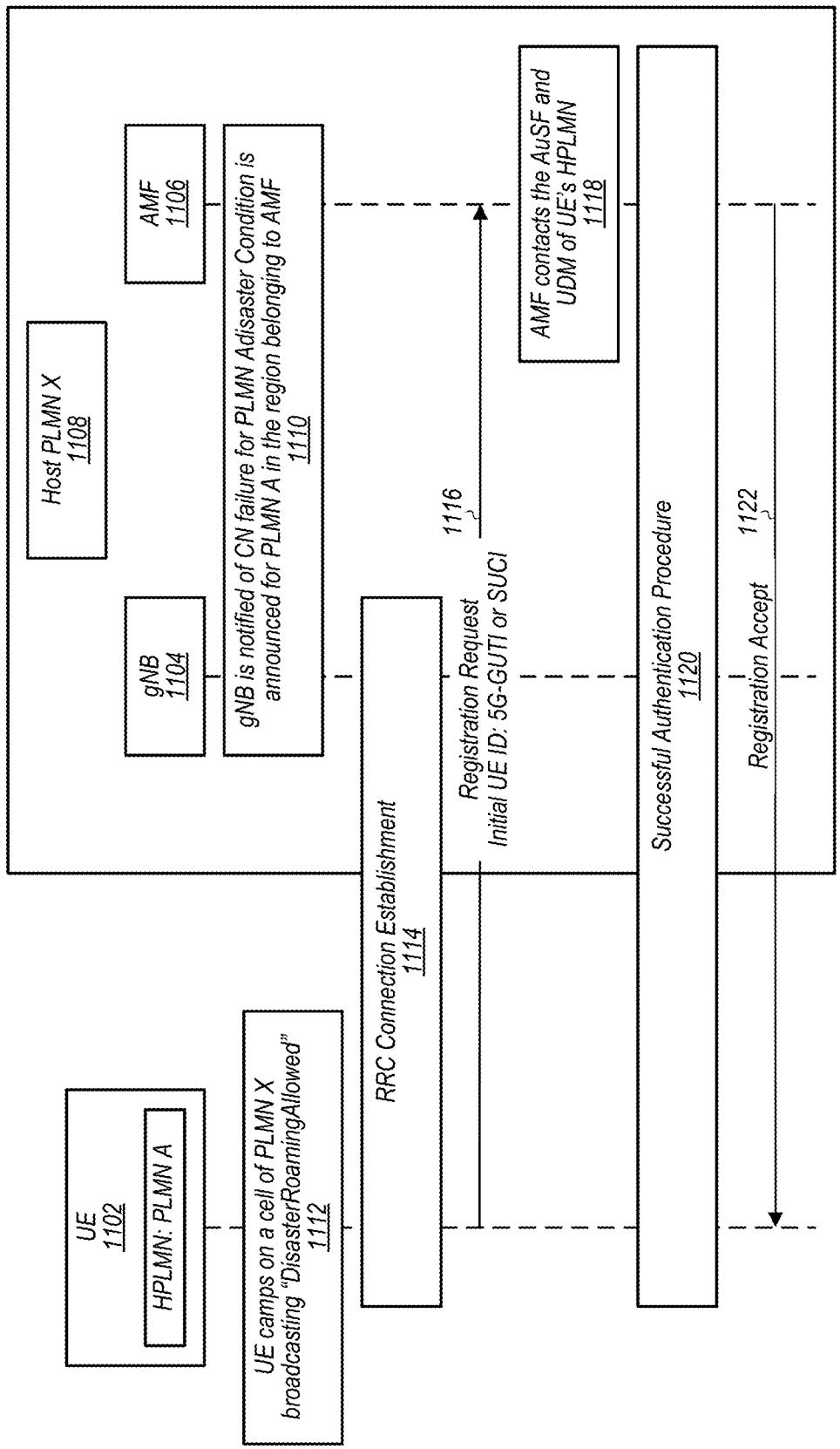
FIG. 11 is a signal flow diagram illustrating example techniques for reducing wireless device service interruptions including supporting temporary registration on a host network by a wireless device when disaster roaming conditions are present, according to some embodiments.

FIG. 11 is a signal flow diagram illustrating example techniques for reducing wireless device service interruptions including supporting temporary registration on a host network by a wireless device when disaster roaming conditions are present, according to some embodiments.

In the illustrated scenario, gNB 1104 and AMF 1106 of PLMN X 1108 may be notified of CN failure for PLMN A (which may be the HPLMN for UE 1102), and gNB 1104 may be broadcasting an indication that disaster roaming is allowed (1110). UE 1102 may be camped on a cell of PLMN X 1108, e.g., that is provided by gNB 1104 (1112). The UE 1102 may perform RRC connection establishment (1114), and may provide a registration request (for normal service) to AMF 1106 (1116). The UE 1102 may not be aware of whether it will get normal service in this PLMN; the service offered may depend on the service level agreement (SLA) between operators, regulatory conditions for the region, and/or if network entities of the UE's HPLMN are still functioning, among various possible considerations. Note that the initial UE ID provided for the registration request could include a 5G NR Global Unique Temporary Identifier (5G-GUTI) or a subscription concealed identifier (SUCI), at least according to some embodiments. The AMF 1106 may attempt to contact the AuSF and UDM of the HPLMN of the UE 1102 (1118). A successful authentication procedure may be performed (e.g., if subscription/authentication related information can be retrieved and there is agreement between the operators) (1120), the AMF 1106 may provide a registration accept message to the UE 1102, and the UE 1102 may be accepted for normal service (1122). Note that in this scenario, the UE may not need to know the status of all (or possibly any) of the conditions upon which the successful registration may depend, and may simply receive an indication of whether it is registered on the temporary host PLMN or not. Note also that if the UE's HPLMN cannot be contacted the registration may be rejected. If this happens, or if the registration otherwise fails, the UE may still be able to perform emergency registration, e.g., if required.

Figure 12:
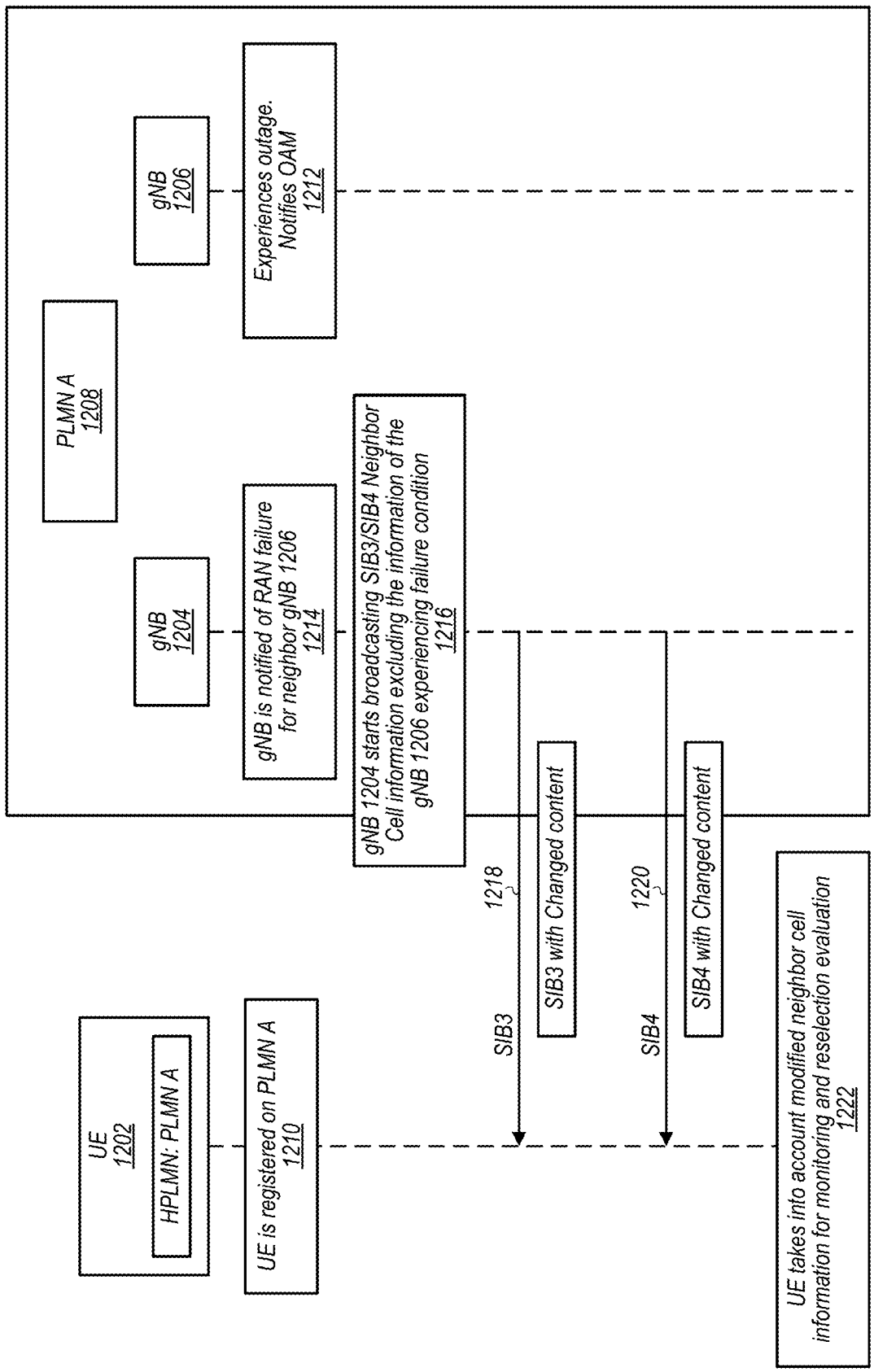
FIG. 12 is a signal flow diagram illustrating example techniques for reducing wireless device service interruptions including providing an indication to a wireless device that a portion of the home radio access network of the wireless device is unavailable, according to some embodiments.

FIG. 12 is a signal flow diagram illustrating example techniques for reducing wireless device service interruptions including providing an indication to a wireless device that a portion of the home radio access network of the wireless device is unavailable, according to some embodiments.

In the illustrated scenario, a UE 1202 may initially be registered on its HPLMN (PLMN A 1208) (1210). A gNB 1206 of the PLMN A 1208 may experience an outage, and may inform the OAM of PLMN A 1208 (1212). A gNB 1204 of the PLMN 1208 (which may provide a serving cell to UE 1202) may be notified of RAN failure for its neighbor gNB 1206 (1214). The gNB 1204 may determine to broadcast SIB3/SIB4 neighbor cell information with neighbor information excluded for the gNB 1206 that is experiencing the failure condition (1216). The SIB3 with changed content may be broadcast (1218), and the SIB4 with changed content may be broadcast (1220). The UE 1202 may receive the updated SIB3/SIB4, and may take into account the modified neighbor cell information for performing neighbor cell monitoring and cell re-selection evaluation (1222).

Figure 13:
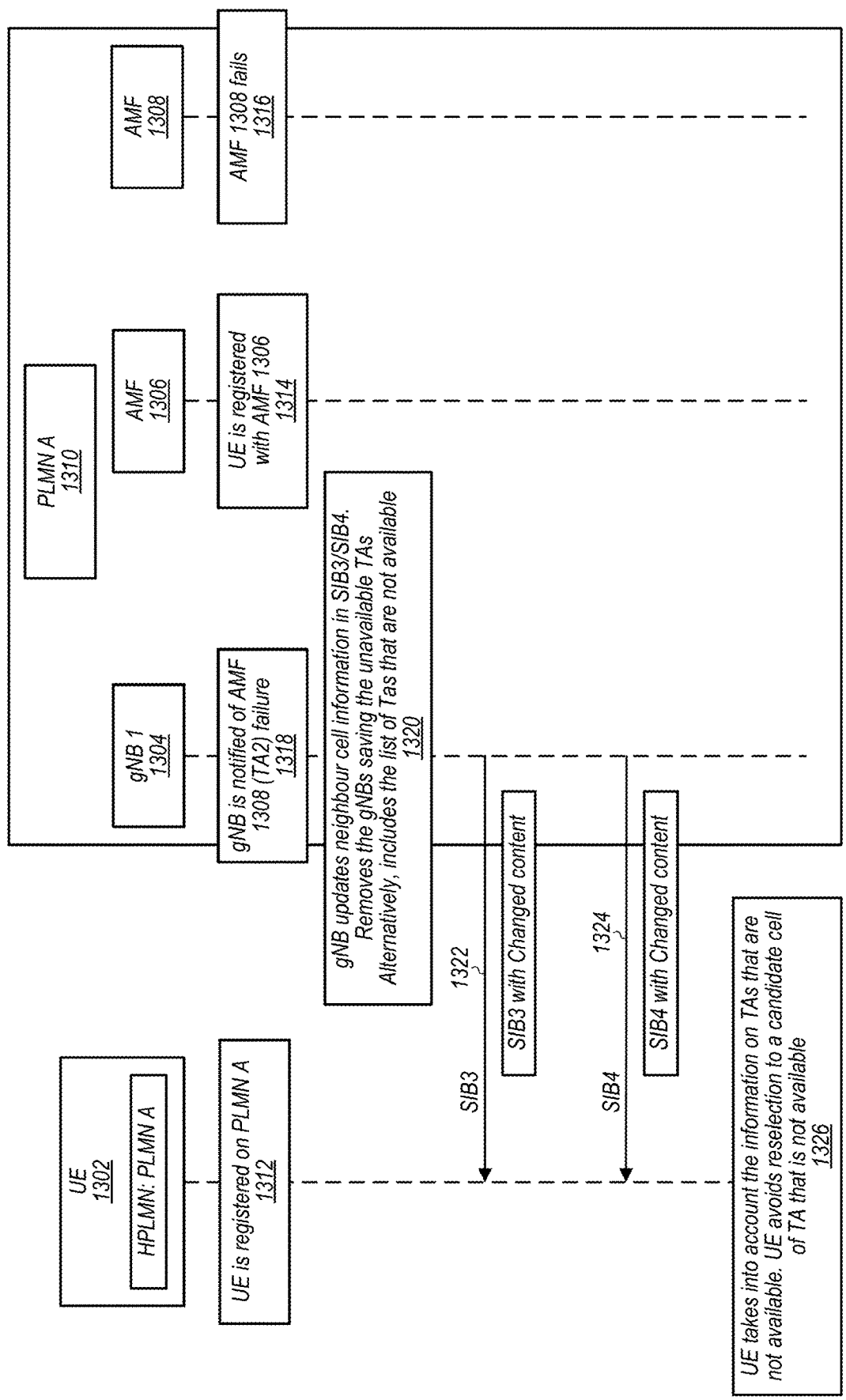
FIG. 13 is a signal flow diagram illustrating example techniques for reducing wireless device service interruptions including providing an indication to a wireless device that a portion of the home core network of the wireless device is unavailable, according to some embodiments.

FIG. 13 is a signal flow diagram illustrating example techniques for reducing wireless device service interruptions including providing an indication to a wireless device that a portion of the home core network of the wireless device is unavailable, according to some embodiments. For example, such techniques may be used in a scenario in which the cell a UE is camped on is still working, but there are CN failures in one or more adjacent tracking areas.

In the illustrated scenario, a UE 1302 may initially be registered on its HPLMN (PLMN A 1310) (1312); in particular, the UE may be registered with AMF 1306 of PLMN A 1310 (1314). AMF 1308 of the PLMN A 1310 may fail (1316). A gNB 1304 of the PLMN 1310 (which may provide a serving cell to UE 1302) may be notified of AMF failure for AMF 1308 (tracking area (TA) 2) (1318). The gNB 1304 may determine to broadcast SIB3/SIB4 neighbor cell information with neighbor information excluded for any gNBs in the unavailable TA (1320). Alternatively, the neighbor cell information may include a list of one or more TAs that are not available. The SIB3 with changed content may be broadcast (1322), and the SIB4 with changed content may be broadcast (1324). The UE 1302 may receive the updated SIB3/SIB4, and may take into account the modified neighbor cell information for performing neighbor cell monitoring and cell re-selection evaluation (e.g., avoiding re-selection to a candidate cell of a TA that is not available) (1326).

Figure 14:
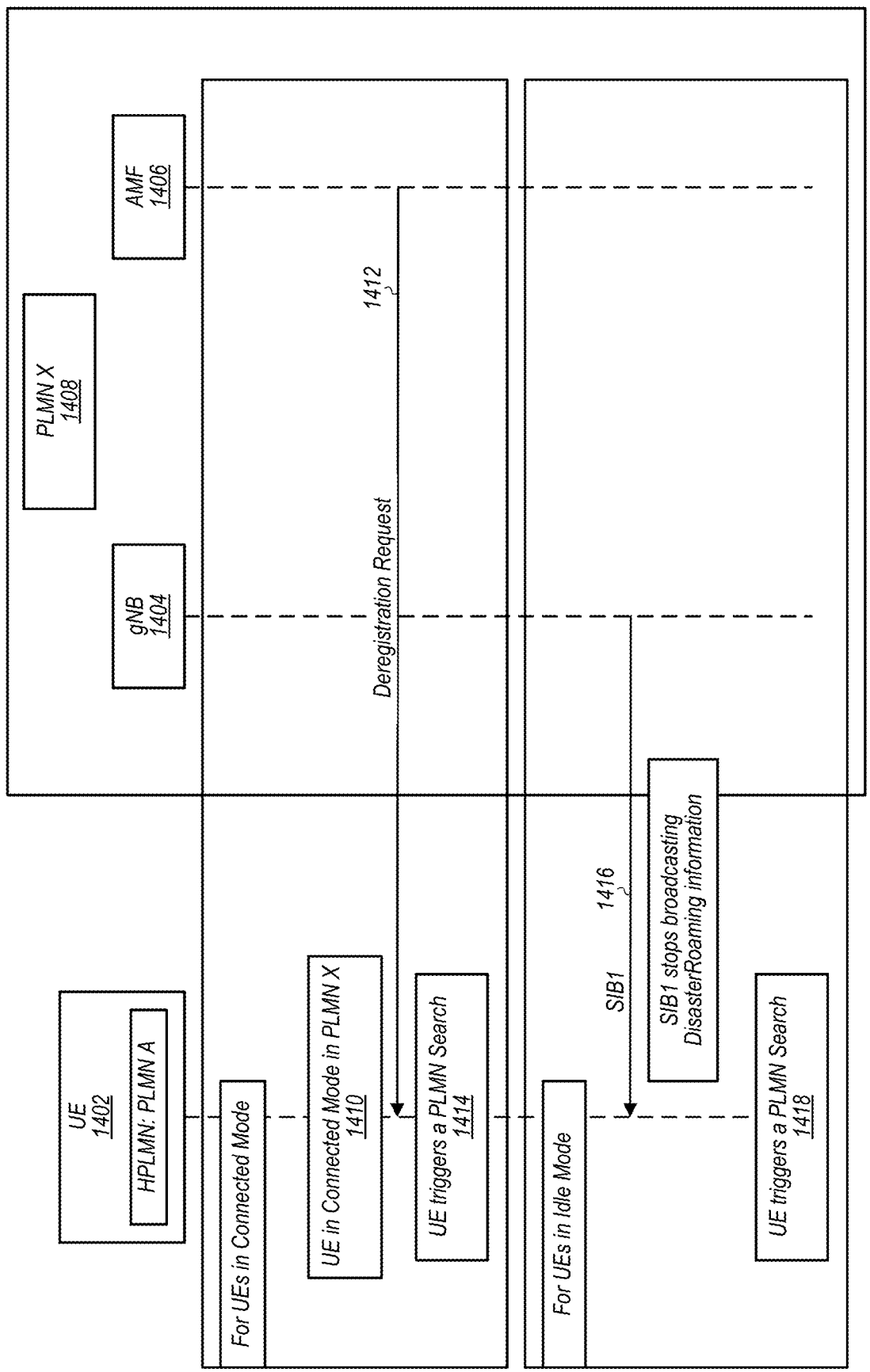
FIG. 14 is a signal flow diagram illustrating example techniques for reducing wireless device service interruptions including facilitating returning a wireless device to home network service after an interruption in service provided by the home network of the wireless device, according to some embodiments.

FIG. 14 is a signal flow diagram illustrating example techniques for reducing wireless device service interruptions including facilitating returning a wireless device to home network service after an interruption in service provided by the home network of the wireless device, according to some embodiments.

When the HPLMN of a UE has returned to service (disaster roaming condition no longer applies), the UE may be notified of the change. To avoid overloading the PLMN A, it may be useful to implement techniques that distribute the return of UEs over time. As one aspect of such techniques, for a UE initiating a periodic registration update or a mobility registration update procedure from idle mode or a service request procedure from idle mode, the AMF may respond with a registration reject message with 4GMM cause #11 "PLMN not allowed" or #13 "Roaming not allowed in this tracking area." Receipt of such a message may trigger the UE to initiate a PLMN search. Similarly, the AMF may reject new initial registration requests from UEs of the PLMN which has returned to service with a registration reject message with 5GMM cause #11 "PLMN not allowed."

In the illustrated scenario, a UE 1402 may be registered on a temporary host PLMN X 1408; its HPLMN may be PLMN A. For when the UE 1402 is in connected mode (1410), the AMF 1406 may provide (e.g., via serving gNB 1404) a de-registration request (1412), for example with detach type="re-registration not required" and 5GMM cause #11 "PLMN not allowed" or #13 "Roaming not allowed in this tracking area." Note that for the decision to provide the de-registration request, the AMF 1406 may take into account the type of ongoing services being provided to the UE 1402. For example, it may be the case that the AMF determines to not interrupt an ongoing IMS emergency call, to not interrupt an ongoing IMS voice of NR (VoNR) call, etc., if possible. Receipt of the de-registration request may trigger the UE to initiate a PLMN search (1414).

For when the UE 1402 is in idle mode, the gNB 1404 may stop broadcasting disaster roaming information in the SIB1 (1416). The UE 1402 may be notified of the change in SIB 1. The UE 1402 may reacquire SIB1 and evaluate the change. Removal of the disaster roaming information may make the cell unsuitable for the UE 1402 to continue camping on. The UE 1402 may trigger a PLMN search (1418), e.g., to potentially return to its HPLMN.

The gNB 1404 may determine to stop broadcasting the disaster roaming at a certain (e.g., implementation dependent) time ("T2") after the HPLMN of the UE 1402 has returned to service (e.g., after the disaster roaming condition no longer applies). The T2 value could be selected to be longer than the periodic registration update timer, in some instances; this may result in a substantial proportion of UEs having already returned to their HPLMN as a result of attempting to perform periodic registration and the registration attempt being rejected, such as previously described herein. In some instances, the T2 value may also or alternatively be selected to be longer than a typical maximum service duration for an IMS emergency session (or IMS VoNR call), e.g., to reduce the likelihood that such a session (call) is dropped because the UE is caused to consider a possible handover candidate cell as unsuitable.

According to some embodiments, attempts to register with a PLMN providing inbound disaster roaming for UEs may utilize unified access control (UAC) congestion management techniques. The initial registration attempt during disaster roaming may be defined as a new standardized access category (e.g., with value <32). The roaming PLMNs may use this access category to prevent or reduce congestion due to inbound roamers, e.g., to help the roaming PLMNs to avoid sharp spikes in registration attempt from many roamers in a short period of time and to stagger the inbound roamers. Roaming UEs that find the access barred for this category may be able to select another PLMN offering disaster inbound roaming service, and/or may attempt to register at a later time after access barring for the PLMN expires. A new access identity may be defined for such temporary inbound roamers. While on a roaming PLMN, the UE may evaluate UAC using this access identity for any subsequent access attempts. This may help the roaming PLMN to avoid reduce the potential impact of congestion due to inbound roamers' presence on its own subscribers. Alternatively, if desired, this access identity may also be used for initial registrations. FIGS. 15-16 are tables illustrating examples of such access parameters that could be used by a wireless device when performing temporary registration on a host network when disaster roaming conditions are present, according to some embodiments.

Note that an alternate approach could include defining a separate UACBarring Info structure, or defining a separate offset value to be applied to the barring factor in unified access control barring information, and to provide such information in system information (e.g., in SIB2), with the information potentially being specified as to be used by inbound roamers only. The roaming PLMN could thus control access barring only for the roamers without affecting its own subscribers in such a manner, if desired.

In some instances, it may be desirable to support the possibility for certain UEs to be able to access enhanced services even when its HPLMN's AuSF and UDM function are not available. As one possibility, such UEs may have a Universal Subscriber Identity Module (USIM) configured with an alternate identity (IMSI), which can be activated when roaming due to a disaster condition. The UE, if its registration request is not successfully completed by the disaster roaming PLMN, may determine to trigger an IMSI refresh procedure, e.g., to activate the new IMSI (e.g., if available). Once the UE registers with the alternate IMSI, the roaming PLMN may be able to authenticate and provide a higher level of service access to the UE.

Figure 17:
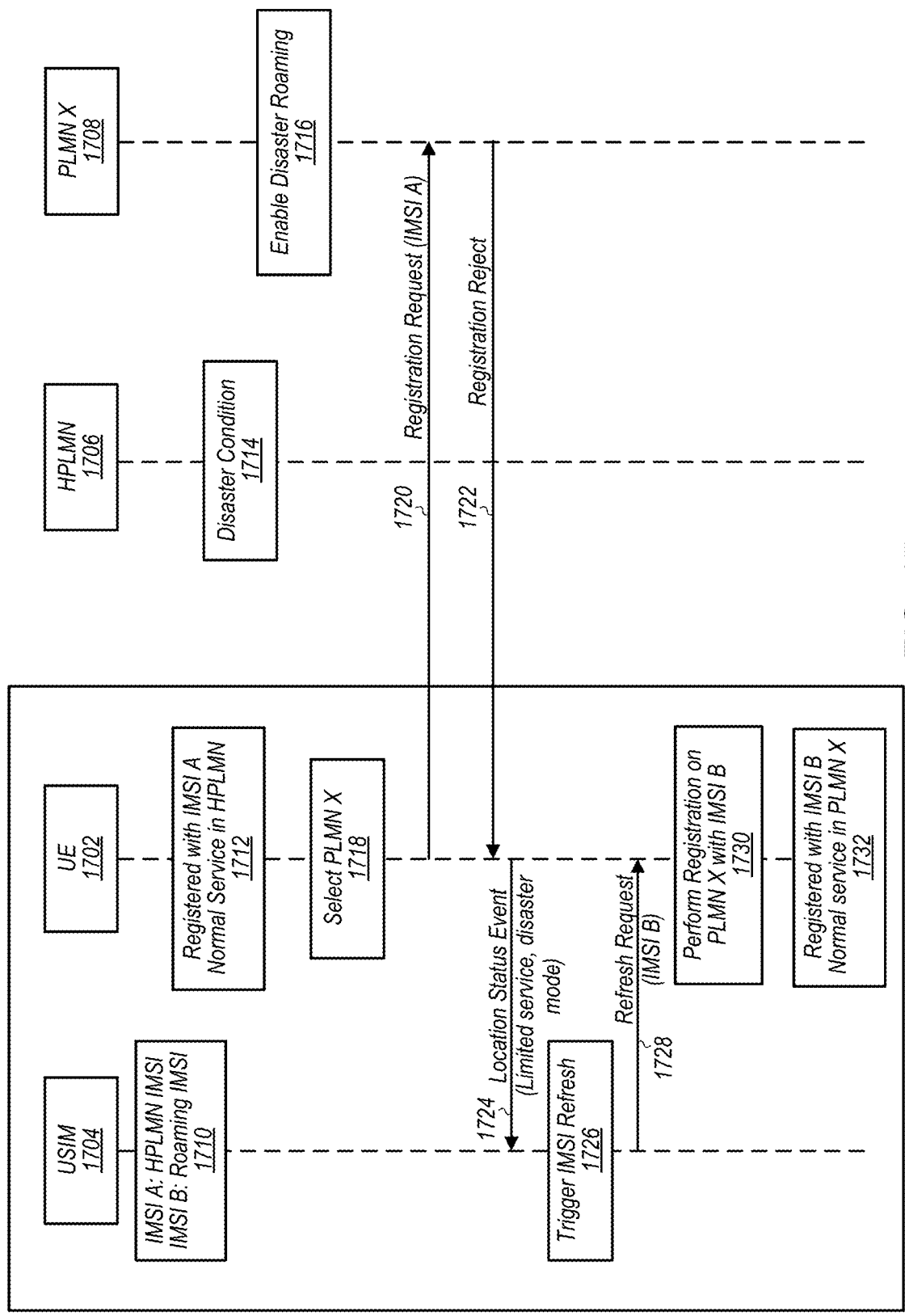
FIG. 17 is a signal flow diagram illustrating an example technique for utilizing an alternate IMSI for roaming/disaster conditions, according to some embodiments.

FIG. 17 is a signal flow diagram illustrating an example technique for utilizing an alternate IMSI for roaming/disaster conditions, according to some embodiments. As shown, a USIM 1704 of a UE 1702 may be configured with a HPLMN IMSI (IMSI A) and a roaming IMSI (IMSI B) (1710). The UE 1702 may initially be registered with IMSI A and receive normal service from the HPLMN 1706 of the UE 1702 (1712). The HPLMN 1706 may declare a disaster condition (1714). Another PLMN (PLMN X 1708) may enable disaster roaming (1716), which may include providing an indication that disaster roaming is supported by the PLMN in system information broadcast by cells associated with PLMN X 1708. The UE 1702 may select PLMN X 1708 for disaster roaming (1718). The UE 1702 may provide a registration request (using IMSI A) to PLMN X 1708 (1720). PLMN X 1708 may reject the registration request (1722). The UE 1702 may provide an indication of a location status event (e.g., indicating limited service and/or disaster mode) to the USIM 1704 (1724). The USIM 1704 may perform an IMSI refresh, e.g., to activate IMSI B based on the location status event indication (1726). The USIM may provide a refresh request (e.g., to activate IMSI B) to the UE 1702 (1728). After the IMSI refresh is complete, the UE may perform registration on PLMN X 1708 with IMSI B (1730). Once registered with PLMN X 1708 using IMSI B, the UE 1702 may receive normal service in PLMN X 1708.

It may be possible for a UE that is unable to access its HPLMN due to a disaster condition and that finds disaster roaming service to undergo mobility to a non-disaster area (e.g., in which the HPLMN is available) and to a cell that is not specifically offering disaster roaming service, in some scenarios. For such scenarios, techniques for steering the UE back to its HPLMN may be useful.

For a UE in RRC idle or inactive mode, the UE may find that neighbor gNBs are not broadcasting that disaster roaming is allowed in SIBS when evaluating candidate cells for re-selection. The UE may treat this condition as a trigger to perform a PLMN search, e.g., to check if it can find cells of its HPLMN and/or other preferred PLMNs.

Figure 18:
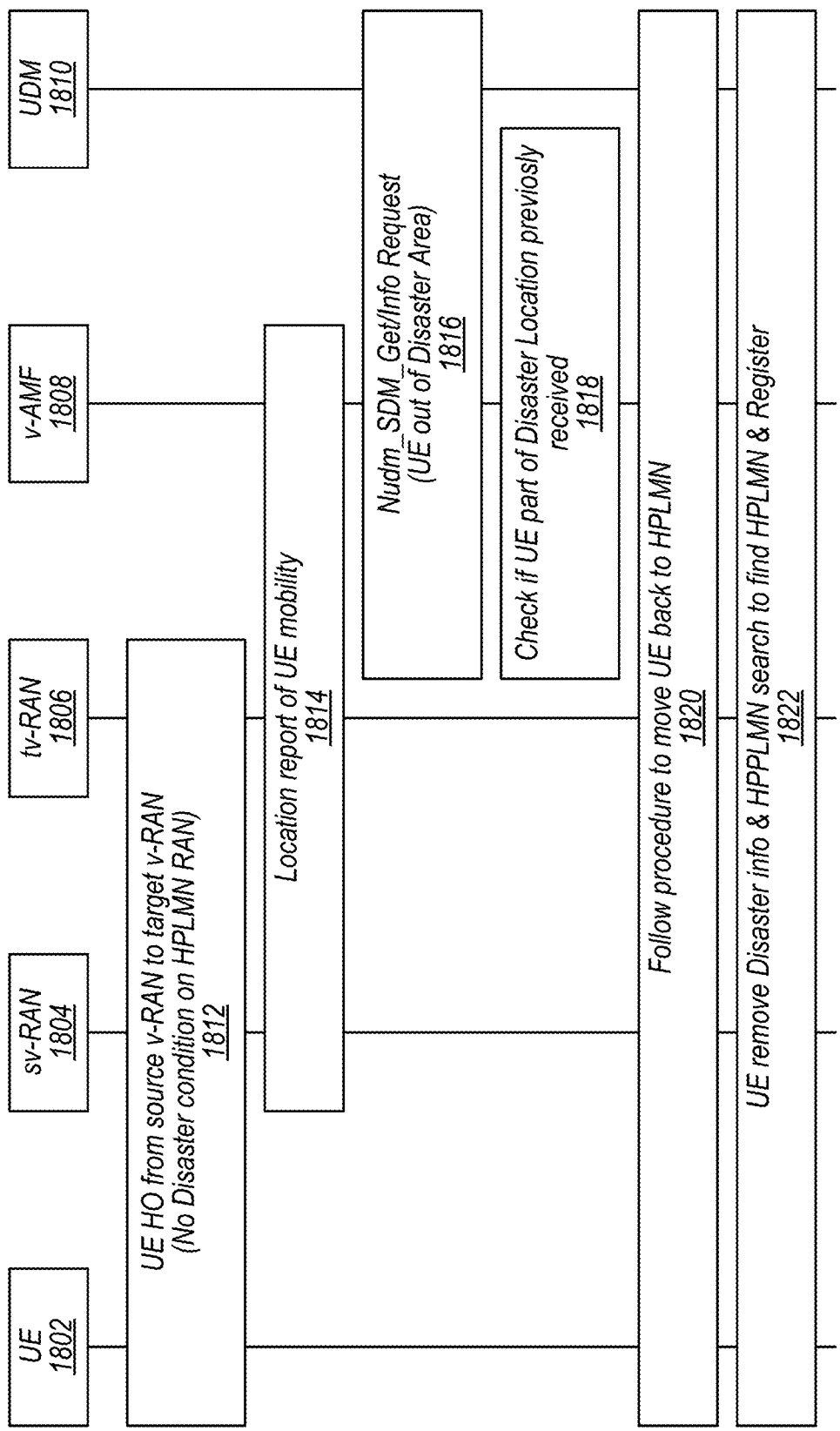
FIG. 18 is a signal flow diagram illustrating additional example techniques for reducing wireless device service interruptions including facilitating returning a wireless device to home network service after an interruption in service provided by the home network of the wireless device, according to some embodiments.

For a UE in RRC connected mode, FIG. 18 is a signal flow diagram illustrating example techniques for facilitating returning the UE to home network service based on mobility to a non-disaster area, according to some embodiments. As shown, in the illustrated scenario, a UE 1802 may be handed over from a source visited RAN (sv-RAN 1804) to a target visited RAN (tv-RAN 1806) (1812), after which the UE 1802 may be in a region with no disaster condition on the HPLMN RAN of the UE 1802. The tv-RAN 1806 may provide a location report to the visited AMF (v-AMF 1808) for the UE mobility (1814). The v-AMF 1808 may have information about which RAN nodes are covering the disaster condition on the UE HPLMN, and may forward the location information for the UE to the HPLMN UDM 1810 to check for updates about the disaster condition (1816). The v-AMF 1808 may check whether the UE is part of a disaster condition area for the HPLMN based on this information (1818). If the v-AMF 1808 confirms that the UE is not in a disaster condition area (e.g., is outside of any such area), it may perform a procedure to move the UE back to its HPLMN (1820), e.g., including sending a de-registration request to the UE. The UE may be triggered to detect that it is out of the disaster area, may change access type (e.g., from access type 3), may reinstate its forbidden PLMN list, and may perform a higher priority PLMN (HPPLMN) search to attempt to find its HPLMN and register with the HPLMN (1822).

Figure 19:
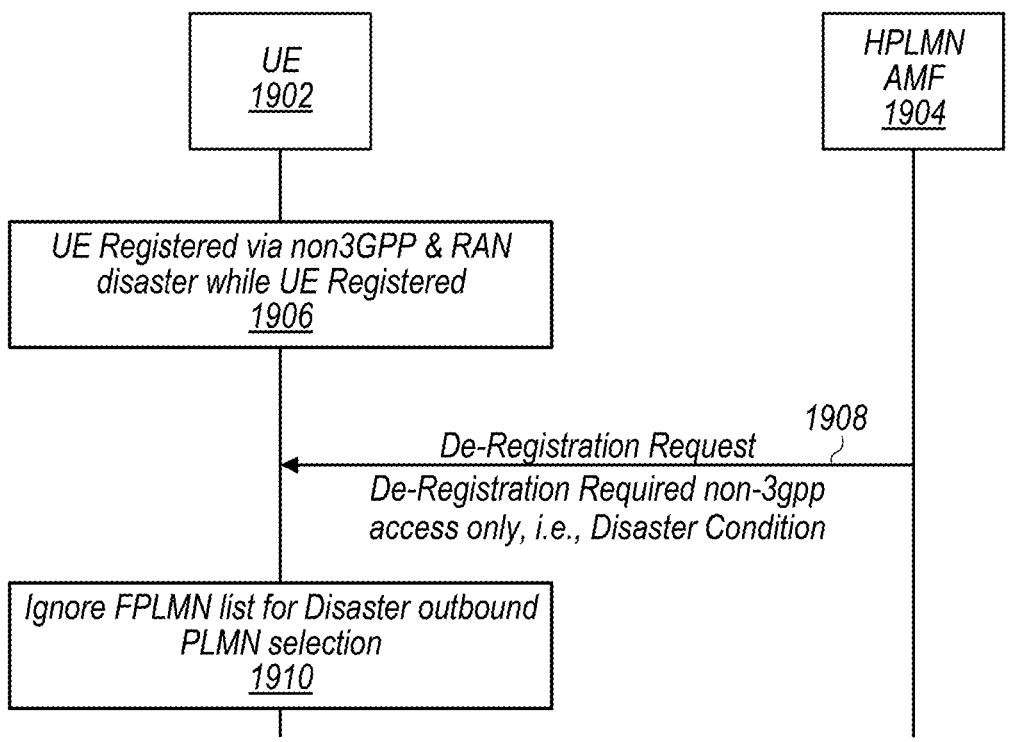
FIG. 19 is a signal flow diagram illustrating example techniques for indicating to a wireless device that disaster roaming conditions are present while the wireless device is registered with a cellular network via a non-3GPP access, according to some embodiments.

In some instances, it may be possible for a UE to be simultaneously registered over non-3GPP access (e.g., in addition to 3GPP access) when a disaster condition occurs affecting RAN access. FIG. 19 is a signal flow diagram illustrating example techniques for indicating to a wireless device that disaster roaming conditions are present in such a scenario, according to some embodiments. As shown, a UE 1902 may be registered with a PLMN via non-3GPP access (e.g., via Wi-Fi, as one possibility), and a disaster condition may occur for the PLMN RAN while the UE is registered (1906). The HPLMN AMF 1904 of the UE 1902 may provide a de-registration request to the UE 1902 over the non-3GPP access with de-registration type indicating "Re-registration required; non-3GPP access only," e.g., as a way of indicating to the UE that a disaster condition is declared for the PLMN in that region (1908). In an alternative, the AMF may provide the indication of disaster condition through another type of non-access stratum (NAS) signaling, such as a UE Configuration Update Command message or downlink NAS transport message. The UE 1902 may perform a PLMN search, temporarily ignoring the forbidden PLMN list, to perform outbound PLMN selection (1910).

In the following further exemplary embodiments are provided.

One set of embodiments may include a baseband processor of a wireless device, wherein the baseband processor is configured to perform operations comprising: receiving an indication of a disaster condition, wherein the disaster condition affects at least a first public land mobile network (PLMN), wherein the first PLMN is a home PLMN of the wireless device; and performing cell selection, wherein one or more cells associated with PLMNs included in a list of PLMNs forbidden for roaming are evaluated for the cell selection based at least in part on the indication of the disaster condition.

According to some embodiments, the indication of the disaster condition includes one or more of: an indication from a first cell belonging to a second PLMN that disaster roaming is allowed on the first cell for subscribers of the first PLMN, wherein the indication from the first cell that disaster roaming is allowed on the first cell for subscribers of the first PLMN is provided in system information broadcast by the first cell; an indication from the first cell that disaster roaming is allowed on the first cell for subscribers of any PLMN; an indication from a second cell that access to the second cell is not currently available, wherein the second cell is associated with the first PLMN, wherein the indication that access to the second cell is not currently available is provided in system information broadcast by the second cell; a radio resource control connection release message from a cell associated with the first PLMN, wherein the radio resource control connection release message includes cause information indicating to activate disaster roaming; or an indication of one or more cells or tracking areas of the first PLMN that are not currently available.

According to some embodiments, the baseband processor is further configured to perform operations comprising: at a later time: determining that the disaster condition does not affect the first PLMN in a location of the baseband processor; and performing cell selection based at least in part on determining that the disaster condition does not affect the first PLMN in the location of the baseband processor, wherein cells associated with PLMNs included in the list of PLMNs forbidden for roaming are excluded from evaluation for the cell selection based at least in part on determining that the disaster condition does not affect the first PLMN in the location of the baseband processor.

According to some embodiments, the baseband processor is further configured to perform operations comprising: selecting a first cell to camp on, wherein the first cell is associated with a second PLMN, wherein the second PLMN is included in the list of PLMNs forbidden for roaming; and performing a registration procedure with the first cell.

According to some embodiments, to perform the registration procedure, the wireless device is further configured to evaluate access to the first cell based on one or more of: an access category associated with disaster roaming; or an access identity number associated with disaster roaming.

According to some embodiments, if the registration procedure with the first cell is unsuccessful, the baseband processor is further configured to perform operations comprising: receiving an indication to perform an international mobile subscriber identity (IMSI) refresh based at least in part on the registration procedure being unsuccessful; performing an IMSI refresh, wherein the IMSI refresh activates a set of security keys configured for use for disaster roaming; and performing a registration procedure with the first cell using the set of security keys configured for use for disaster roaming.

According to some embodiments, the baseband processor is further configured to perform operations comprising: at a later time: receiving a de-registration request indicating that access the second PLMN is not allowed; and performing cell selection, wherein cells associated with the second PLMN are not evaluated for the cell selection based at least in part on the de-registration request indicating that access to the second PLMN is not allowed.

According to some embodiments, the indication of the disaster condition includes a de-registration request provided via non-3GPP access, wherein the de-registration request indicates that re-registration is required and that only non-3GPP access to the home PLMN of the wireless device is available.

According to some embodiments, the baseband processor is further configured to perform operations comprising: selecting a lower priority PLMN from a list of preferred PLMNs if a higher priority PLMN is determined to be available only through a disaster roaming PLMN when searching for a PLMN for disaster roaming service; and suspending periodic searches for higher priority PLMNs of the wireless device while registered on the disaster roaming PLMN if all higher priority PLMNs for a current mobile country code of the wireless device are included in a list of PLMNs subject to the disaster condition broadcast by the disaster roaming PLMN.

According to some embodiments, the baseband processor is further configured to perform operations comprising: successfully registering on a disaster roaming PLMN acting on behalf of the home PLMN or an equivalent home PLMN or any non-forbidden PLMNs of the wireless device; and suspending periodic searches for the home PLMN or an equivalent home PLMN or any higher priority PLMN of the wireless device while registered on the disaster roaming PLMN based at least in part on successfully registering on the disaster roaming PLMN.

Another set of embodiments may include a method, comprising: by a cellular network element associated with a first public land mobile network (PLMN): receiving an indication of a disaster condition affecting a second PLMN; receiving a registration request from a wireless device, wherein the first PLMN is a forbidden PLMN for the wireless device, wherein the second PLMN is a home PLMN of the wireless device; and accepting the registration request from the wireless device based at least in part on the disaster condition affecting the second PLMN.

According to some embodiments, the method further comprises: performing successful authentication of the wireless device with one or more network functions of the second PLMN, wherein accepting the registration request from the wireless device is further based at least in part on performing successful authentication of the wireless device with the one or more network functions of the second PLMN.

According to some embodiments, the method further comprises: receiving an indication that the disaster condition does not apply to the second PLMN; and providing an indication that the disaster condition does not apply to the second PLMN to the wireless device, wherein the indication that the disaster condition does not apply to the second PLMN includes one or more of: a de-registration request, wherein the de-registration request includes an indication that the wireless device is not allowed to access the first PLMN; or a non-access stratum (NAS) signaling message wherein the NAS signaling message includes an indication that the disaster condition does not apply to the second PLMN and a timer value, wherein the timer value configures the wireless device to leave the first PLMN after expiry of a timer with the timer value.

Yet another set of embodiments may include a cellular base station, comprising: an antenna; a radio operably coupled to the antenna; and a processor operably coupled to the radio; wherein the cellular base station is configured to: receive an indication of a disaster condition affecting at least one public land mobile network (PLMN); and provide an indication of the disaster condition to a wireless device.

According to some embodiments, the cellular base station is associated with a first PLMN, wherein the disaster condition affects a second PLMN, wherein the indication of the disaster condition includes an indication that disaster roaming is allowed via a cell provided by the cellular base station.

According to some embodiments, the cellular base station is further configured to: receive an indication that the disaster condition no longer affects the second PLMN; and stop providing the indication that disaster roaming is allowed via the cell provided by the cellular base station based at least in part on the indication that the disaster condition no longer affects the second PLMN.

According to some embodiments, the cellular base station is further configured to: broadcast system information for the cell provided by the cellular base station, wherein the system information includes unified access control barring information for inbound disaster roaming, wherein the unified access control barring information includes a barring factor configured for use for registration due to disaster roaming; wherein the unified access control barring information further includes an offset to apply to the barring factor by devices accessing a network associated with the cellular base station due to disaster roaming.

According to some embodiments, the cellular base station is associated with a first PLMN, wherein the disaster condition affects the first PLMN, wherein the indication of the disaster condition includes an indication that access to a cell provided by the cellular base station is currently unavailable.

According to some embodiments, the cellular base station is associated with a first PLMN, wherein the disaster condition affects the first PLMN, wherein the indication of the disaster condition includes an indication of one or more cells or tracking areas of the first PLMN affected by the first PLMN.

According to some embodiments, the cellular base station is associated with a first PLMN, wherein the disaster condition affects the first PLMN, wherein the indication of the disaster condition includes a radio resource control connection release message indicating to the wireless device to activate disaster roaming.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor of a wireless device, wherein the baseband processor is configured to perform operations comprising:
   receiving an indication of a disaster condition, wherein the disaster condition affects at least a first public land mobile network (PLMN), wherein the first PLMN is a home PLMN of the wireless device, wherein the indication of the disaster condition includes one or more of:
      an indication from a first cell belonging to a second PLMN that disaster roaming is allowed on the first cell for subscribers of the first PLMN, wherein the indication from the first cell that disaster roaming is allowed on the first cell for subscribers of the first PLMN is provided in system information broadcast by the first cell;
      an indication from the first cell that disaster roaming is allowed on the first cell for subscribers of any PLMN;
      an indication from a second cell that access to the second cell is not currently available, wherein the second cell is associated with the first PLMN, wherein the indication that access to the second cell is not currently available is provided in system information broadcast by the second cell, wherein an additional indication that one or more Tracking Areas are not suitable due to the disaster condition is provided in system information broadcast by the second cell;
      a radio resource control connection release message from a cell associated with the first PLMN, wherein the radio resource control connection release message includes cause information indicating to activate disaster roaming; or
      an indication of one or more cells or tracking areas of the first PLMN that are not currently available; and
   performing cell selection, wherein one or more cells associated with PLMNs included in a list of PLMNs forbidden for roaming are evaluated for the cell selection based at least in part on the indication of the disaster condition.

2. The baseband processor of claim 1, wherein the baseband processor is further configured to perform operations, after said performing cell selection, comprising:
   determining that the disaster condition does not affect the first PLMN in a location of the baseband processor; and
   performing cell selection based at least in part on determining that the disaster condition does not affect the first PLMN in the location of the baseband processor, wherein cells associated with PLMNs included in the list of PLMNs forbidden for roaming are excluded from evaluation for the cell selection based at least in part on determining that the disaster condition does not affect the first PLMN in the location of the baseband processor.

3. The baseband processor of claim 1, wherein the baseband processor is further configured to perform operations comprising:
    selecting a first cell to camp on, wherein the first cell is associated with a second PLMN, wherein the second PLMN is included in the list of PLMNs forbidden for roaming; and
    performing a registration procedure with the first cell.

4. The baseband processor of claim 3, wherein to perform the registration procedure, the wireless device is further configured to evaluate access to the first cell based on one or more of:
    an access category associated with disaster roaming; or
    an access identity number associated with disaster roaming.

5. The baseband processor of claim 3, wherein if the registration procedure with the first cell is unsuccessful, the baseband processor is further configured to perform operations comprising:
    receiving an indication to perform an international mobile subscriber identity (IMSI) refresh based at least in part on the registration procedure being unsuccessful;
    performing an IMSI refresh, wherein the IMSI refresh activates a set of security keys configured for use for disaster roaming; and
    performing a registration procedure with the first cell using the set of security keys configured for use for disaster roaming.

6. The baseband processor of claim 3, wherein the baseband processor is further configured to perform operations, after said performing cell selection, comprising:
    receiving a de-registration request indicating that access the second PLMN is not allowed; and
    performing cell selection, wherein cells associated with the second PLMN are not evaluated for the cell selection based at least in part on the de-registration request indicating that access to the second PLMN is not allowed.

7. The baseband processor of claim 1,
    wherein the indication of the disaster condition is associated with a de-registration request provided via non-3GPP access, wherein the de-registration request indicates that re-registration is required and that only non-3GPP access to the home PLMN of the wireless device is available.

8. The baseband processor of claim 1, wherein the baseband processor is further configured to perform operations comprising:
    selecting a lower priority PLMN from a list of preferred PLMNs if a higher priority PLMN is determined to be available only through a disaster roaming PLMN when searching for a PLMN for disaster roaming service; and
    suspending periodic searches for higher priority PLMNs of the wireless device while registered on the disaster roaming PLMN if all higher priority PLMNs for a current mobile country code of the wireless device are included in a list of PLMNs subject to the disaster condition broadcast by the disaster roaming PLMN.

9. The baseband processor of claim 1, wherein the baseband processor is further configured to perform operations comprising:
    successfully registering on a disaster roaming PLMN acting on behalf of the home PLMN or an equivalent home PLMN of the wireless device; and
    suspending periodic searches for the home PLMN or an equivalent home PLMN of the wireless device while registered on the disaster roaming PLMN based at least in part on successfully registering on the disaster roaming PLMN.

10. A method, comprising:
    receiving an indication of a disaster condition, wherein the disaster condition affects at least a first public land mobile network (PLMN), wherein the first PLMN is a home PLMN of a wireless device, wherein the indication of the disaster condition includes one or more of:
    an indication from a first cell belonging to a second PLMN that disaster roaming is allowed on the first cell for subscribers of the first PLMN, wherein the indication from the first cell that disaster roaming is allowed on the first cell for subscribers of the first PLMN is provided in system information broadcast by the first cell;
    an indication from the first cell that disaster roaming is allowed on the first cell for subscribers of any PLMN;
    an indication from a second cell that access to the second cell is not currently available, wherein the second cell is associated with the first PLMN, wherein the indication that access to the second cell is not currently available is provided in system information broadcast by the second cell, wherein an additional indication that one or more Tracking Areas are not suitable due to the disaster condition is provided in system information broadcast by the second cell;
    a radio resource control connection release message from a cell associated with the first PLMN, wherein the radio resource control connection release message includes cause information indicating to activate disaster roaming; or
    an indication of one or more cells or tracking areas of the first PLMN that are not currently available; and
    performing cell selection, wherein one or more cells associated with PLMNs included in a list of PLMNs forbidden for roaming are evaluated for the cell selection based at least in part on the indication of the disaster condition.

11. The method of claim 10, after said performing cell selection, further comprising:
    determining that the disaster condition does not affect the first PLMN in a location of the wireless device; and
    performing cell selection based at least in part on determining that the disaster condition does not affect the first PLMN in the location of the wireless device,
    wherein cells associated with PLMNs included in the list of PLMNs forbidden for roaming are excluded from evaluation for the cell selection based at least in part on determining that the disaster condition does not affect the first PLMN in the location of the wireless device.

12. The method of claim 10, further comprising:
    selecting a first cell to camp on, wherein the first cell is associated with a second PLMN, wherein the second PLMN is included in the list of PLMNs forbidden for roaming; and
    performing a registration procedure with the first cell.

13. The method of claim 12, wherein performing the registration procedure comprises evaluating access to the first cell based on one or more of:
    an access category associated with disaster roaming; or
    an access identity number associated with disaster roaming.

14. The method of claim 12, wherein if the registration procedure with the first cell is unsuccessful, the method further comprises:

receiving an indication to perform an international mobile subscriber identity (IMSI) refresh based at least in part on the registration procedure being unsuccessful;

performing an IMSI refresh, wherein the IMSI refresh activates a set of security keys configured for use for disaster roaming; and performing a registration procedure with the first cell using the set of security keys configured for use for disaster roaming.

15. The method of claim 12, after said performing cell selection, further comprising:

receiving a de-registration request indicating that access the second PLMN is not allowed; and performing cell selection, wherein cells associated with the second PLMN are not evaluated for the cell selection based at least in part on the de-registration request indicating that access to the second PLMN is not allowed.

16. The method of claim 10, wherein the indication of the disaster condition is associated with a de-registration request provided via non-3GPP access, wherein the de-registration request indicates that re-registration is required and that only non-3GPP access to the home PLMN of the wireless device is available.

17. A method, comprising:

transmitting, to a wireless device, an indication of a disaster condition, wherein the disaster condition affects at least a first public land mobile network (PLMN), wherein the first PLMN is a home PLMN of the wireless device, wherein the indication of the disaster condition includes one or more of:

an indication from a first cell belonging to a second PLMN that disaster roaming is allowed on the first cell for subscribers of the first PLMN, wherein the indication from the first cell that disaster roaming is allowed on the first cell for subscribers of the first PLMN is provided in system information broadcast by the first cell;

an indication from the first cell that disaster roaming is allowed on the first cell for subscribers of any PLMN;

an indication from a second cell that access to the second cell is not currently available, wherein the second cell is associated with the first PLMN, wherein the indication that access to the second cell is not currently available is provided in system information broadcast by the second cell, wherein an additional indication that one or more Tracking Areas are not suitable due to the disaster condition is provided in system information broadcast by the second cell;

a radio resource control connection release message from a cell associated with the first PLMN, wherein the radio resource control connection release message includes cause information indicating to activate disaster roaming; or an indication of one or more cells or tracking areas of the first PLMN that are not currently available; and wherein one or more cells associated with PLMNs included in a list of PLMNs forbidden for roaming are available for cell selection for the wireless device based at least in part on the indication of the disaster condition.

18. The method of claim 17, wherein the indication of the disaster condition is associated with a de-registration request provided via non-3GPP access, wherein the de-registration request indicates that re-registration is required and that only non-3GPP access to the home PLMN of the wireless device is available.

19. The method of claim 17, wherein the method further comprises:

transmitting an indication to perform an international mobile subscriber identity (IMSI) refresh based at least in part on a registration procedure being unsuccessful.

20. The method of claim 19, wherein the method further comprises:

performing an IMSI refresh, wherein the IMSI refresh activates a set of security keys configured for use for disaster roaming.

* * * * *